United States Patent
Karunamuni et al.

(10) Patent No.: US 10,289,660 B2
(45) Date of Patent: May 14, 2019

(54) DEVICE, METHOD, AND GRAPHICAL USER INTERFACE FOR SHARING A CONTENT OBJECT IN A DOCUMENT

(71) Applicant: Apple Inc., Cupertino, CA (US)

(72) Inventors: Chanaka G. Karunamuni, San Jose, CA (US); Laurent Baumann, Campbell, CA (US); Julien Yann Robert, Paris (FR); Alexandre F. Carlhian, Paris (FR); Alexandre Moha, Gentilly (FR); Philippe Champeaux, Paris (FR)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 13/710,379

(22) Filed: Dec. 10, 2012

(65) Prior Publication Data

US 2013/0212470 A1 Aug. 15, 2013

Related U.S. Application Data

(60) Provisional application No. 61/599,375, filed on Feb. 15, 2012.

(51) Int. Cl.
*G06F 17/24* (2006.01)
*G06F 3/0482* (2013.01)
(Continued)

(52) U.S. Cl.
CPC ............ *G06F 17/24* (2013.01); *G06F 3/0482* (2013.01); *G06F 3/0486* (2013.01);
(Continued)

(58) Field of Classification Search
CPC ...... G06F 17/24; G06F 3/0482; G06F 3/0486; G06F 3/04842; G06F 3/04883; G06F 3/0488
(Continued)

(56) References Cited

U.S. PATENT DOCUMENTS 5,446,842 A * 8/1995 Schaeffer et al. ............. 709/205
5,798,752 A 8/1998 Buxton et al.
(Continued)

FOREIGN PATENT DOCUMENTS

CN 1360249 A 7/2002
CN 101535939 A 9/2009
(Continued)

OTHER PUBLICATIONS

International Preliminary Report on Patentability received for PCT Patent Application No. PCT/US2013/025937, dated Aug. 19, 2014, 8 pages.
(Continued)

*Primary Examiner* — Stephen S Hong
*Assistant Examiner* — Hope C Sheffield
(74) *Attorney, Agent, or Firm* — Dentons US LLP

(57) ABSTRACT

An electronic device with a display: concurrently displays a first electronic document and a second electronic document, the first electronic document including a displayed content object; detects a first user input that starts on the content object; in response to a determination that the first user input corresponds to a first command, creates and displays a copy of the content object in the second electronic document; and, in response to a determination that the first user input corresponds to a second command, distinct from the first command: selects the content object; displays an animation of the content object separating from the first electronic document; and initiates display of a plurality of icons proximate to the separated content object, the plurality of icons including at least one icon to initiate display of a user interface for sending the content object to one or more other users.

39 Claims, 33 Drawing Sheets

(51) Int. Cl.
  *G06F 3/0486* (2013.01)
  *G06F 3/0484* (2013.01)
  *G06F 3/0488* (2013.01)
(52) U.S. Cl.
  CPC ........ *G06F 3/0488* (2013.01); *G06F 3/04842* (2013.01); *G06F 3/04883* (2013.01)
(58) Field of Classification Search
  USPC ...................................................... 715/243
  See application file for complete search history.

(56) References Cited

U.S. PATENT DOCUMENTS

| | | | |
|---|---|---|---|
| 6,167,455 A * | 12/2000 | Friedman | G06F 9/4443 719/320 |
| 6,664,991 B1 * | 12/2003 | Chew | G06F 3/04883 715/812 |
| 7,343,559 B1 * | 3/2008 | Fujita et al. | 715/733 |
| 7,761,507 B2 * | 7/2010 | Herf et al. | 709/204 |
| 8,060,821 B2 | 11/2011 | Seymour et al. | |
| 8,255,830 B2 | 8/2012 | Ording et al. | |
| 8,448,083 B1 | 5/2013 | Migos et al. | |
| 8,744,852 B1 | 6/2014 | Seymour et al. | |
| 2002/0008719 A1 * | 1/2002 | Miyawaki | G06F 3/0486 715/764 |
| 2002/0056575 A1 | 5/2002 | Keely et al. | |
| 2002/0057260 A1 | 5/2002 | Mathews et al. | |
| 2002/0057261 A1 | 5/2002 | An et al. | |
| 2002/0057263 A1 | 5/2002 | Keely et al. | |
| 2002/0089547 A1 | 7/2002 | Huapaya | |
| 2003/0169301 A1 | 9/2003 | McCauley et al. | |
| 2004/0051738 A1 | 3/2004 | Huapaya | |
| 2004/0071344 A1 | 4/2004 | Lui et al. | |
| 2004/0239686 A1 * | 12/2004 | Koyama | G06Q 10/107 345/620 |
| 2005/0025363 A1 | 2/2005 | Lui et al. | |
| 2005/0088422 A1 | 4/2005 | Keely et al. | |
| 2005/0088423 A1 | 4/2005 | Keely et al. | |
| 2006/0033751 A1 | 2/2006 | Keely et al. | |
| 2006/0253802 A1 | 11/2006 | Kim | |
| 2007/0157089 A1 * | 7/2007 | Van Os | G06F 3/04817 715/702 |
| 2008/0040668 A1 | 2/2008 | Ala-Rantala | |
| 2008/0172389 A1 | 7/2008 | Cho | |
| 2008/0229206 A1 | 9/2008 | Seymour et al. | |
| 2009/0138827 A1 | 5/2009 | Van Os et al. | |
| 2009/0288012 A1 * | 11/2009 | Hertel | G06Q 20/02 715/738 |
| 2010/0066705 A1 | 3/2010 | Keely et al. | |
| 2010/0070899 A1 * | 3/2010 | Hunt et al. | 715/769 |
| 2010/0175011 A1 | 7/2010 | Song et al. | |
| 2010/0180222 A1 | 7/2010 | Otsuka et al. | |
| 2011/0018827 A1 | 1/2011 | Wang et al. | |
| 2011/0099507 A1 * | 4/2011 | Nesladek | G01C 21/265 715/780 |
| 2011/0202827 A1 * | 8/2011 | Freishtat et al. | 715/234 |
| 2011/0202848 A1 * | 8/2011 | Ismalon | 715/738 |
| 2011/0202879 A1 * | 8/2011 | Stovicek et al. | 715/738 |
| 2011/0219332 A1 * | 9/2011 | Park | 715/808 |
| 2011/0252349 A1 * | 10/2011 | Chaudhri | 715/769 |
| 2011/0265035 A1 * | 10/2011 | Lepage et al. | 715/810 |
| 2012/0066595 A1 | 3/2012 | Sung et al. | |
| 2012/0151416 A1 * | 6/2012 | Bell | G02B 27/2228 715/848 |
| 2013/0293500 A1 | 11/2013 | Keely et al. | |
| 2014/0096072 A1 | 4/2014 | Otsuka et al. | |

FOREIGN PATENT DOCUMENTS

| | | |
|---|---|---|
| CN | 101778224 A | 7/2010 |
| EP | 1 205 836 A2 | 5/2002 |
| EP | 2207346 A1 | 7/2010 |
| EP | 2280339 A1 | 2/2011 |
| JP | 9-101874 A | 4/1997 |
| JP | 2000-000235 A | 1/2000 |
| JP | 2001-117686 A | 4/2001 |
| JP | 2002-189567 A | 7/2002 |
| JP | 2005-198064 A | 7/2005 |
| JP | 2008-176479 A | 7/2008 |
| JP | 2010-160763 A | 7/2010 |
| JP | 2011-28560 A | 2/2011 |
| JP | 2011-204282 A | 10/2011 |
| KR | 10-2009-0035499 A | 4/2009 |
| WO | 2008/017936 A2 | 2/2008 |

OTHER PUBLICATIONS

"Microsoft Outlook", Wikipedia, available at <http://en.wikipedia.org/wiki/Microsoft_Outlook>, retrieved on Aug. 25, 2014, 11 pages.

Camera Plus Pro, "Shoot", available at <http://www.globaldelight.com/iphone/camerapluspro/index.html>, retrieved on Aug. 25, 2014, 3 pages.

Camera+, "Great Photos", available at <http://campl.us/>, retrieved on Aug. 25, 2014, 7 pages.

D'Oliveiro, Lawrence, "Whatever Happened to Compound Documents?", Velocity Reviews, available at <http://www.velocityreviews.com/forums/t723106-whatever-happened-to-compound-documents.html>, May 15, 2010, 7 pages.

Flexygen, "Flex and OpenDoc", Adobe Flex and AIR development, available at <http://flexygen.wordpress.com/2007/12/21/flex-and-opendoc/>, retrieved on Aug. 25, 2014, 3 pages.

Tang, Sang, "Using iWork as an Image Editor", Tuaw, available at <http://www.tuaw.com/2009/09/19/using-iwork-as-an-image-editor/>, Sep. 19, 2009, 5 pages.

Thurana, Jeffry, "How to Be More Productive on Mac with The Help of Services", makeuseof, Karbonn Titanium S5 Plus, available at <http://www.makeuseof.com/tag/productive-services-mac/>, Aug. 25, 2010, 6 pages.

Moore, E., "Copying and Moving Files," cugg.org, Jul. 6, 2008, http://web.archive.org/web/20080706120152/http://www.cugg.org/docs/tips/emoore/copy_move/copy_move.htm.

International Search Report and Written Opinion dated May 15, 2013, received in International Patent Application No. PCT/US2013/025937, which corresponds to U.S. Appl. No. 13/710,379, 13 pages (Baumann).

Office Action received for Australian Patent Application No. 2010350739, dated Aug. 23, 2013, 3 pages.

Office Action received for Chinese Patent Application No. 201010592864.9, dated May 6, 2013, 5 pages (Official Copy only). (See Communication under 37 CFR § 1.98(a) (3)).

Office Action received for Korean Patent Application No. 10-2012-7029270, dated Dec. 4, 2013, 4 pages (Official Copy only). (See Communication under 37 CFR § 1.98(a) (3)).

Non-Final Office Action received for U.S. Appl. No. 12/888,375, dated Sep. 30, 2013, 10 pages.

Seymour et al., U.S. Appl. No. 11/643,257, filed Dec. 20, 2006, 44 pages. (Copy not attached).

Office Action received for Australian Patent Application No. 2013221659, dated May 25, 2015, 3 pages.

Paste by Drag, Office Class for Beginners at https://web.archi, Feb. 20, 2008, 2 pages (Only Official Copy) (See Communication under 37 CFR § 1.98(a) (3)).

Office Action received for Korean Patent Application No. 10-2014-7025668, dated Feb. 29, 2016, 11 pages (5 pages of English Translation and 6 pages of Official Copy).

Office Action received for Japanese Patent Application No. 2014-557743, dated Oct. 13, 2015, 9 pages (5 pages of English Translation and 4 pages of Official Copy).

Hamachan.Info, "Drag & Paste : Office Lesson for Beginners", Available at <https://web.archive.org/web/20080220082449/http://hamachan.info/internet/harituke.html>, Feb. 20, 2008, 4 pages (See Communication under 37 CFR § 1.98(a) (3)).

Okwave, "What is "Send the URL of the image by e-mail" ? —Internet Trouble", Available at <http://okwave.jp/qa/q6704731.html>, Apr. 30, 2011, 15 pages. (See Communication under 37 CFR § 1.98(a) (3)).

(56) References Cited

OTHER PUBLICATIONS

Office Action received for Japanese Patent Application No. 2014-557743, dated Aug. 5, 2016, 7 pages (3 pages of English Translation and 4 pages of Official Copy).
Notice of Acceptance received for Australian Patent Application No. 2013221659, dated May 12, 2016, 3 pages.
Notice of Allowance received for Korean Patent Application No. 10-2014-7025668, dated Jun. 8, 2017, 5 pages (2 pages of English Translation and 3 pages of Official Copy).
Office Action received for Korean Patent Application No. 10-2014-7025668, dated Jan. 31, 2017, 6 pages (3 pages of English Translation and 3 pages of Official Copy).
Notice of Allowance received for Japanese Patent Application No. 2014-557743, dated Jan. 5, 2017, 3 pages (Official Copy Only). {See Communication Under 37 CFR § 1.98(a) (3)}.
Office Action received for Chinese Patent Application No. 201380019239.7, dated Sep. 20, 2016, 16 pages (4 pages of English Translation and 12 pages of Official Copy).
Office Action received for European Patent Application No. 13707951.3, dated Nov. 29, 2016, 4 pages.
Office Action received for Chinese Patent Application No. 201380019239.7, dated Jul. 27, 2017, 14 pages (4 pages of English Translation and 10 pages of Official Copy).
Marks, Tracy, "Lesson Two: My computer and Explorer", Window Manual, Published on 1997, pp. 1-4.
Office Action received for European Patent Application No. 13707951.3, dated Nov. 20, 2017, 5 pages.
Pinola, Melanie, "How to Copy, Cut, and Paste for Beginners", Available online at: https://web.archive.org/web/20110515161448/https://lifehacker.com/5801525/help-new-pc-users-learn-how-to-copy-cut-and-paste, Published on May 15, 2011, pp. 1-5.
"65 Reasons Mac Sucks", Available online at: https://web.archive.org/web/20091217045206/http://wanderingstan.com/2009-12-11/65-reasons-mac-sucks, Published on Dec. 17, 2009, pp. 1-17.
Summons to Attend Oral Proceedings received for European Patent Application No. 13707951.3, dated Jul. 31, 2018, 9 pages.
Office Action received for Chinese Patent Application No. 201380019239.7, dated Apr. 11, 2018, 11 pages (3 pages of English Translation and 8 pages of Official Copy).
Board Decision received for Chinese Patent Application No. 201380019239.7, dated Dec. 5, 2018, 2 pages (1 page of English translation and 1 page of official copy).

\* cited by examiner

DEVICE, METHOD, AND GRAPHICAL USER INTERFACE FOR SHARING A CONTENT OBJECT IN A DOCUMENT

RELATED APPLICATION

This application claims priority on U.S. Provisional Application Ser. No. 61/599,375, filed Feb. 15, 2012, which is incorporated herein by reference in its entirety.

TECHNICAL FIELD

This relates generally to electronic devices that display objects in a graphical user interface, including but not limited to electronic devices that display content objects in documents.

BACKGROUND

Manipulation of user interface objects on a display is common on computers and other electronic computing devices. For example, a user may want to move text, graphics, a digital image, a digital video, or some other content object from one electronic document to another electronic document, or the user may want to send the content object to another user. Such manipulations may be performed using any of a variety of input devices, such as a touch-sensitive surface (e.g., touch pad or touch screen) or a mouse.

But existing methods for sharing content objects are cumbersome and inefficient, often requiring several steps or resort to obscure menu commands, for example. This is tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for sharing content objects in a document. Such methods and interfaces may complement or replace conventional methods for sharing content objects in a document. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices that display content objects are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display. The method includes: concurrently displaying a first electronic document and a second electronic document on the display, the first electronic document including a displayed content object; detecting a first user input that starts on the content object; in response to a determination that the first user input corresponds to a first command, creating and displaying a copy of the content object in the second electronic document; and, in response to a determination that the first user input corresponds to a second command, distinct from the first command: selecting the content object, displaying an animation of the content object separating from the first electronic document, and initiating display of a plurality of icons proximate to the separated content object, the plurality of icons including at least one icon to initiate display of a user interface for sending the content object to one or more other users.

In accordance with some embodiments, a method is performed at an electronic device with a display. The method includes: displaying a first electronic document on the display, the first electronic document including a displayed content object; detecting a first user input on the content object; and in response to detecting the first user input: selecting the content object, displaying an animation of the content object separating from the first electronic document, visually deemphasizing the first electronic document relative to the separated content object, and initiating display of a plurality of icons proximate to the separated content object, the plurality of icons including at least one icon to initiate display of a user interface for sending the content object to one or more other users.

In accordance with some embodiments, a method is performed at an electronic device with a display. The method includes: displaying a first electronic document on the display, the first electronic document including a displayed content object; detecting a first user input; and in response to detecting the first user input: selecting the content object, displaying an animation of the content object separating from the first electronic document, visually deemphasizing the first electronic document relative to the separated content object, and initiating display of a plurality of editing icons proximate to the separated content object.

In accordance with some embodiments, an electronic device includes a display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a display, cause the device to perform the operations of any of the methods described above. In accordance with some embodiments, an electronic device includes: a display; and means for performing the operations of any of the methods described above. In accordance with some embodiments, an information processing apparatus, for use in an electronic device with a display, includes means for performing the operations of any of the methods described above.

In accordance with some embodiments, an electronic device includes a display unit configured to concurrently display a first electronic document and a second electronic document on the display unit, the first electronic document including a displayed content object; and a processing unit coupled to the display unit. The processing unit is configured to: detect a first user input that starts on the content object; in response to a determination that the first user input corresponds to a first command, create and enable display of a copy of the content object in the second electronic document; and, in response to a determination that the first user input corresponds to a second command, distinct from the first command: select the content object, enable display of an animation of the content object separating from the first electronic document, and initiate display of a plurality of icons proximate to the separated content object, the plurality of icons including at least one icon to initiate display of a user interface for sending the content object to one or more other users.

In accordance with some embodiments, an electronic device includes a display unit configured to display a first electronic document on the display unit, the first electronic document including a displayed content object; and a processing unit coupled to the display unit. The processing unit is configured to: detect a first user input on the content object; and in response to detecting the first user input: select the content object, enable display of an animation of the content object separating from the first electronic document, visually deemphasize the first electronic document relative to the separated content object, and initiate display of a plurality of icons proximate to the separated content object, the plurality of icons including at least one icon to initiate display of a user interface for sending the content object to one or more other users.

In accordance with some embodiments, an electronic device includes a display unit configured to display a first electronic document on the display unit, the first electronic document including a displayed content object; and a processing unit coupled to the display unit. The processing unit is configured to: detect a first user input; and in response to detecting the first user input: select the content object, enable display of an animation of the content object separating from the first electronic document, visually deemphasize the first electronic document relative to the separated content object, and initiate display of a plurality of editing icons proximate to the separated content object.

Thus, electronic devices with displays are provided with faster, more efficient methods and interfaces for sharing content objects in a document, thereby increasing the effectiveness, efficiency, and user satisfaction with such devices. Such methods and interfaces may complement or replace conventional methods for sharing content objects in a document.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Documents accessed by a user may include any number of content objects, such as images, embedded video, and text highlighted by the user. The user may wish to share just the content object, rather than the whole document, with others. Existing methods typically require the user to open an interface for performing the sharing that take multiple steps, which may not be evident to a user. The embodiments below describe an improved method for sharing content objects in a document. For a document with a content object, the user may perform a particular user input on the content object (e.g., a press and hold input). In response to the particular user input, the content object is visually separated from the document (thus placing the focus on the content object) and icons for initiating user interfaces for sharing the content object are displayed. In some embodiments, if a user decides to move the content object to another electronic document, instead of sharing the content object with another user, the user interface seamlessly transitions from the interface for sharing the content object with other users to an interface for moving the content object to another document. This method simplifies content object sharing from any document. A related method may also be used to present an editing interface for editing a content object in a document.

Below, FIGS. 1A-1B, 2, 3, 9-10 provide a description of exemplary devices. FIGS. 4A-4B and 5A-5D illustrate exemplary user interfaces for sharing content objects in documents. FIGS. 6A-6D and 7 are flow diagrams illustrating methods of sharing content objects in documents. FIG.

Figure 5A:
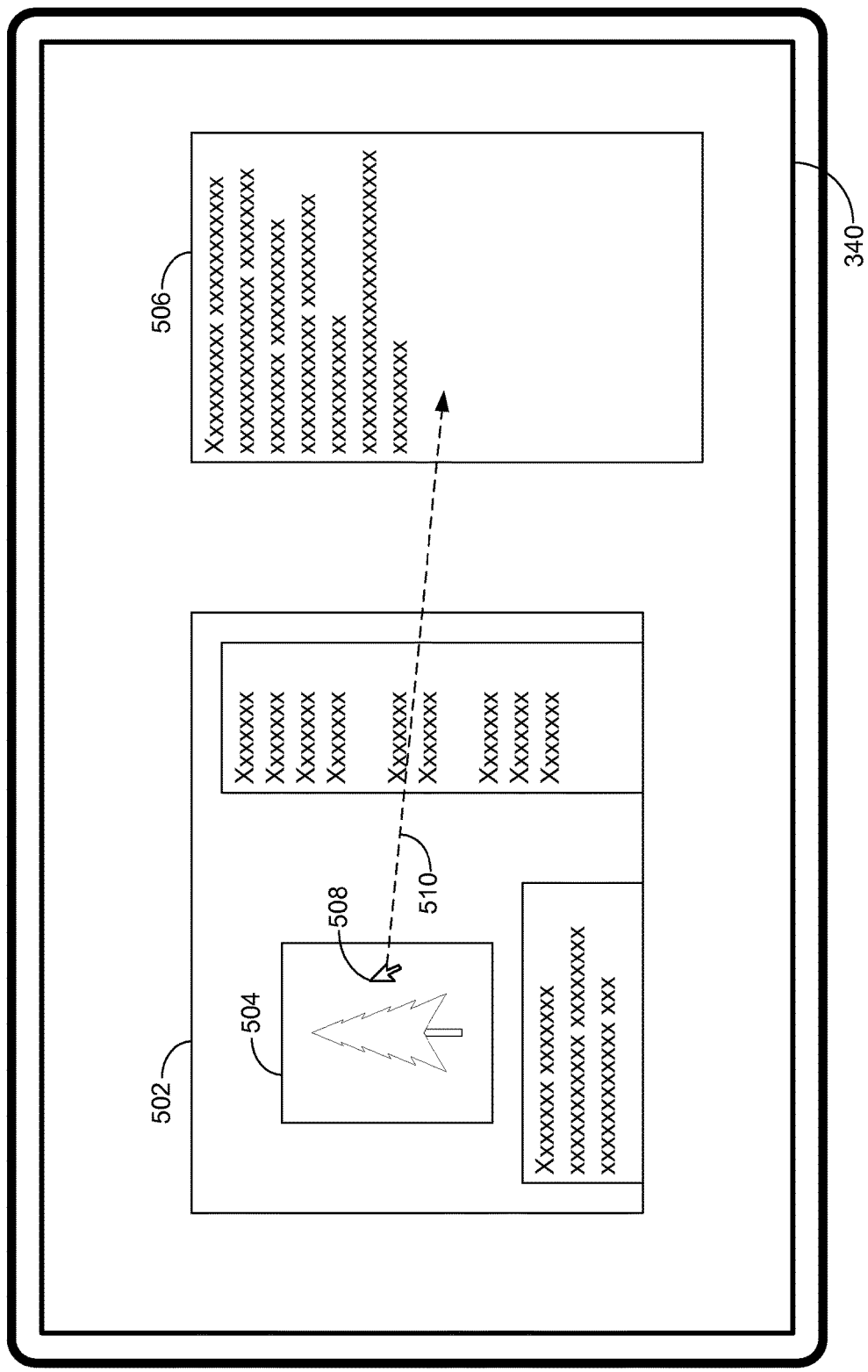
FIGS. 5A-5S illustrate exemplary user interfaces for manipulating content objects in a document in accordance with some embodiments.
Figure 5B:
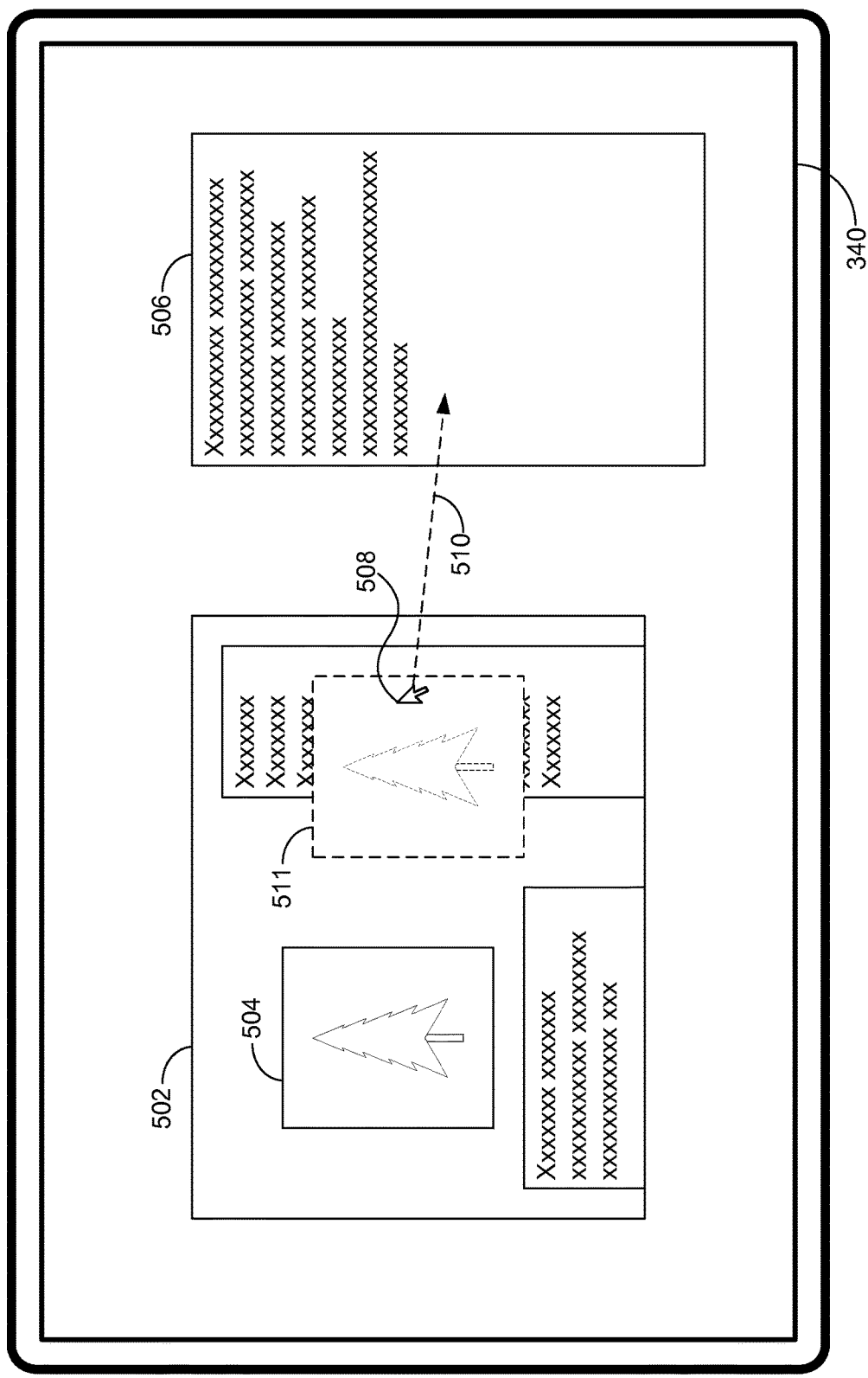

8 is a flow diagram illustrating a method of displaying an editing interface for a content object in a document. The user interfaces in FIGS. 5A-5S are used to illustrate the processes in FIGS. 6A-6D, 7 and 8.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, IPOD Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
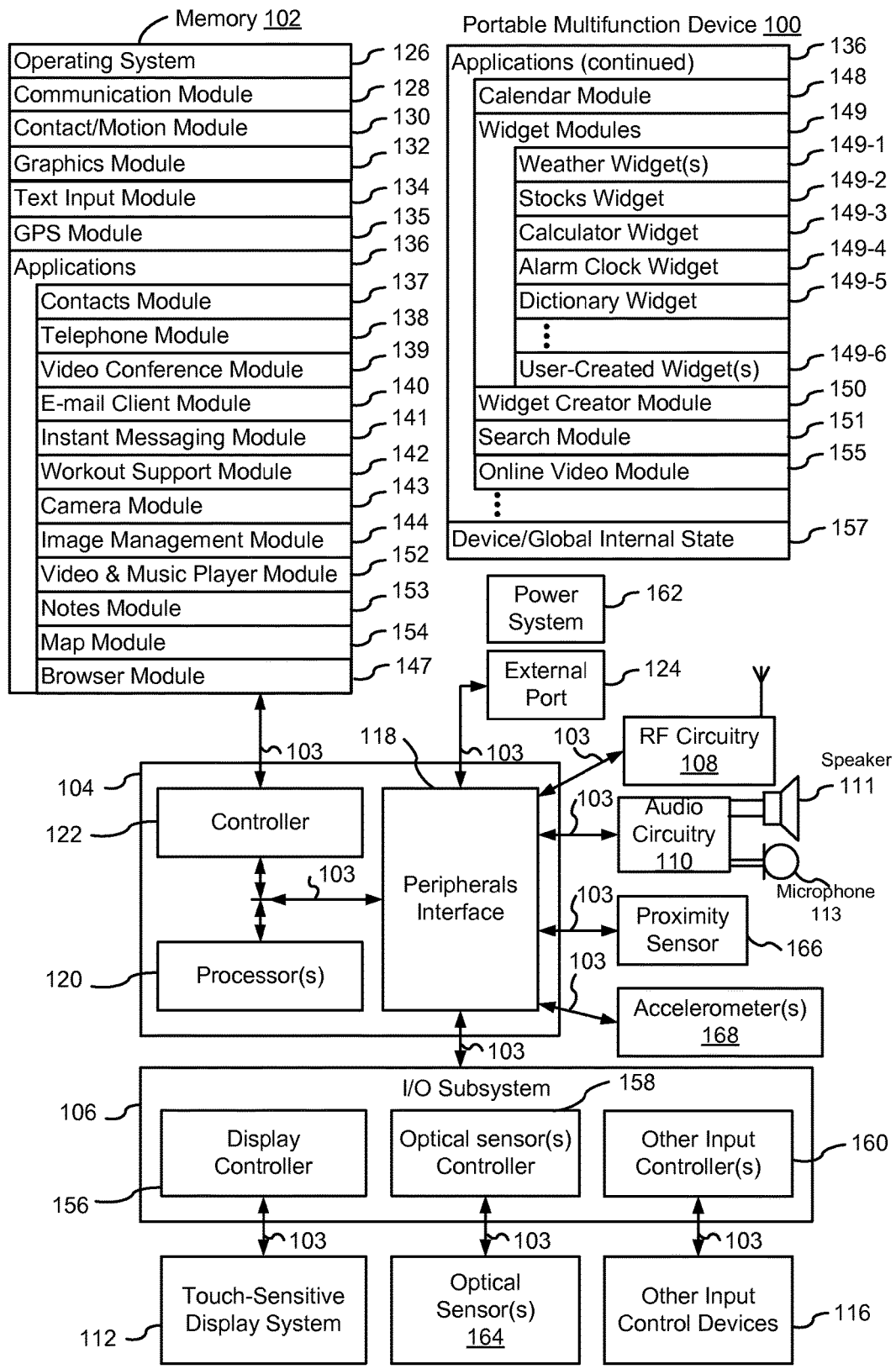
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), BLUETOOTH, Wireless Fidelity (WI-FI) (e.g., IEEE 802.11a, IEEE 802.11b, IEEE 802.11g and/or IEEE 802.11n), voice over Internet Protocol (VoIP), WI-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, IPOD Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
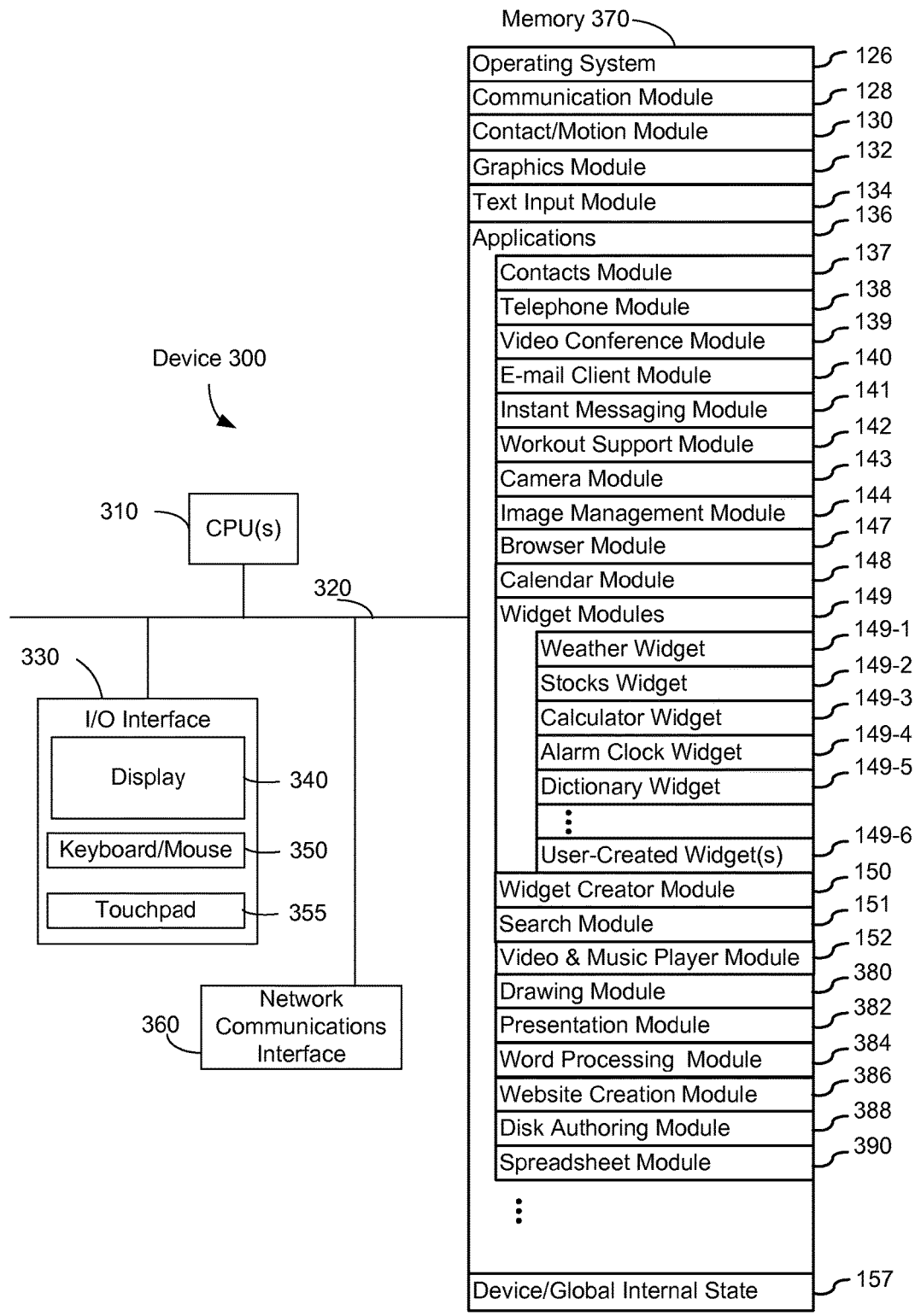
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VXWORKS) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on IPOD (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JAVASCRIPT file (e.g., YAHOO WIDGETs).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an IPOD (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
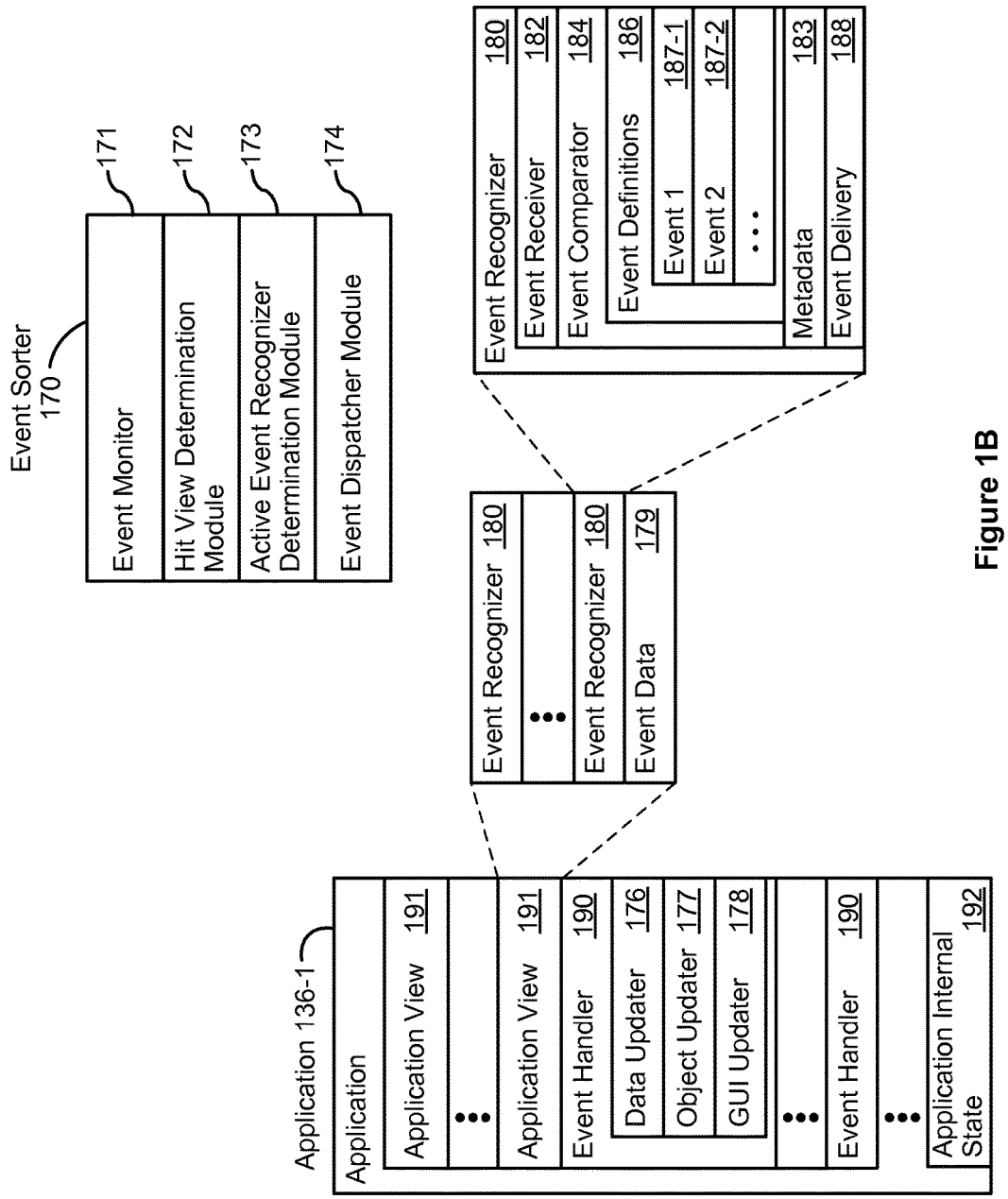
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
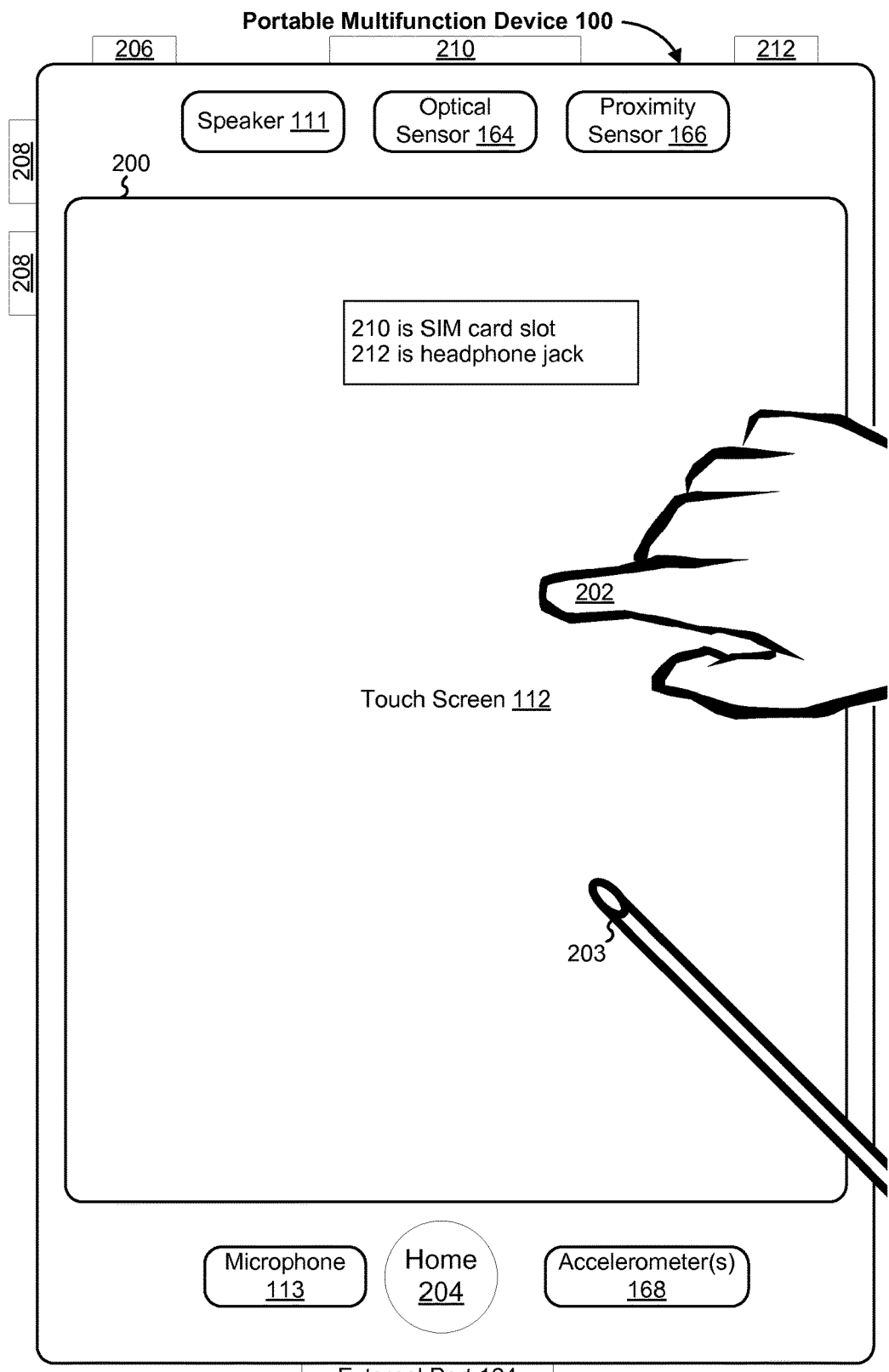
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
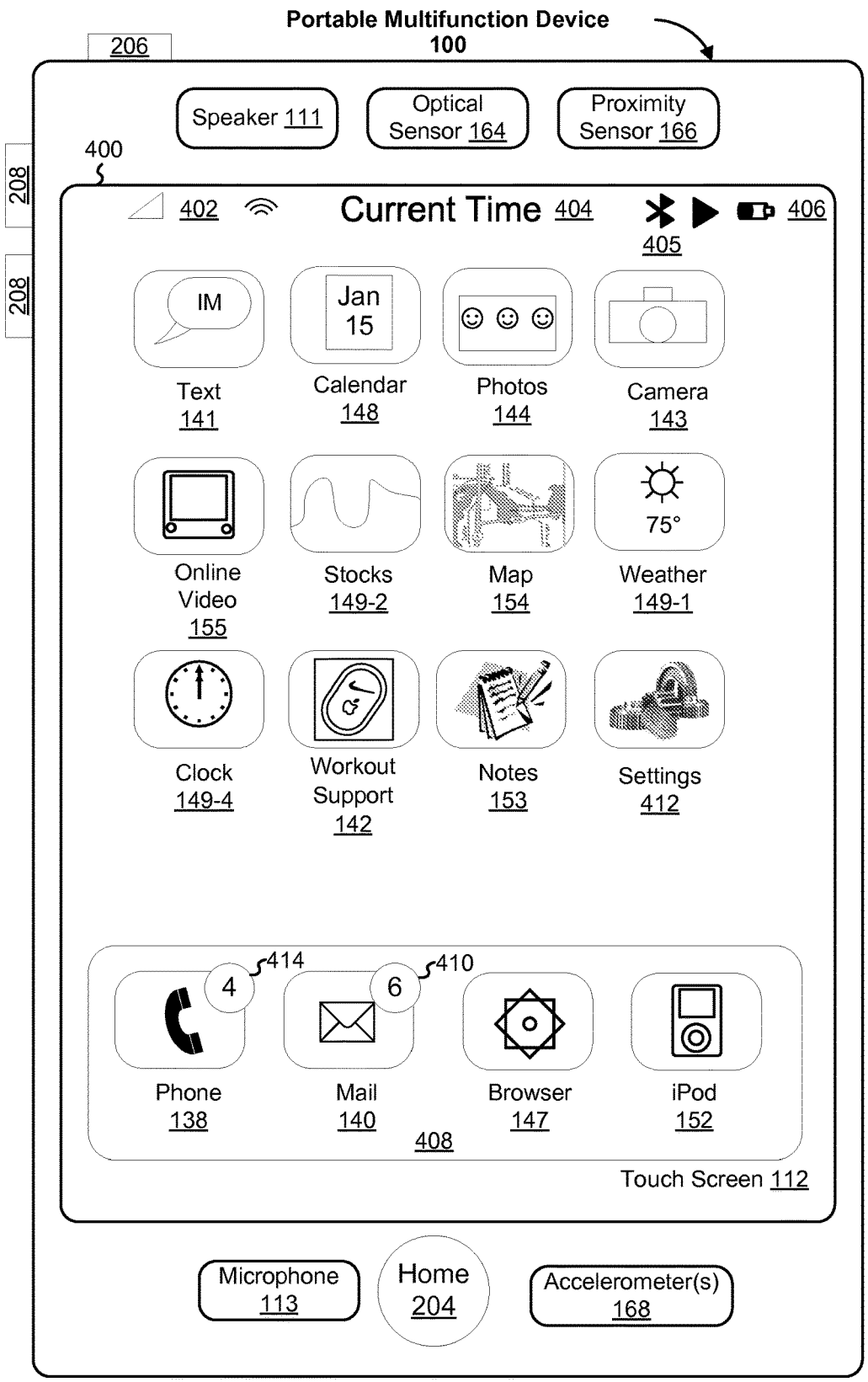
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and WI-FI signals;
Time 404;
BLUETOOTH indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as IPOD (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
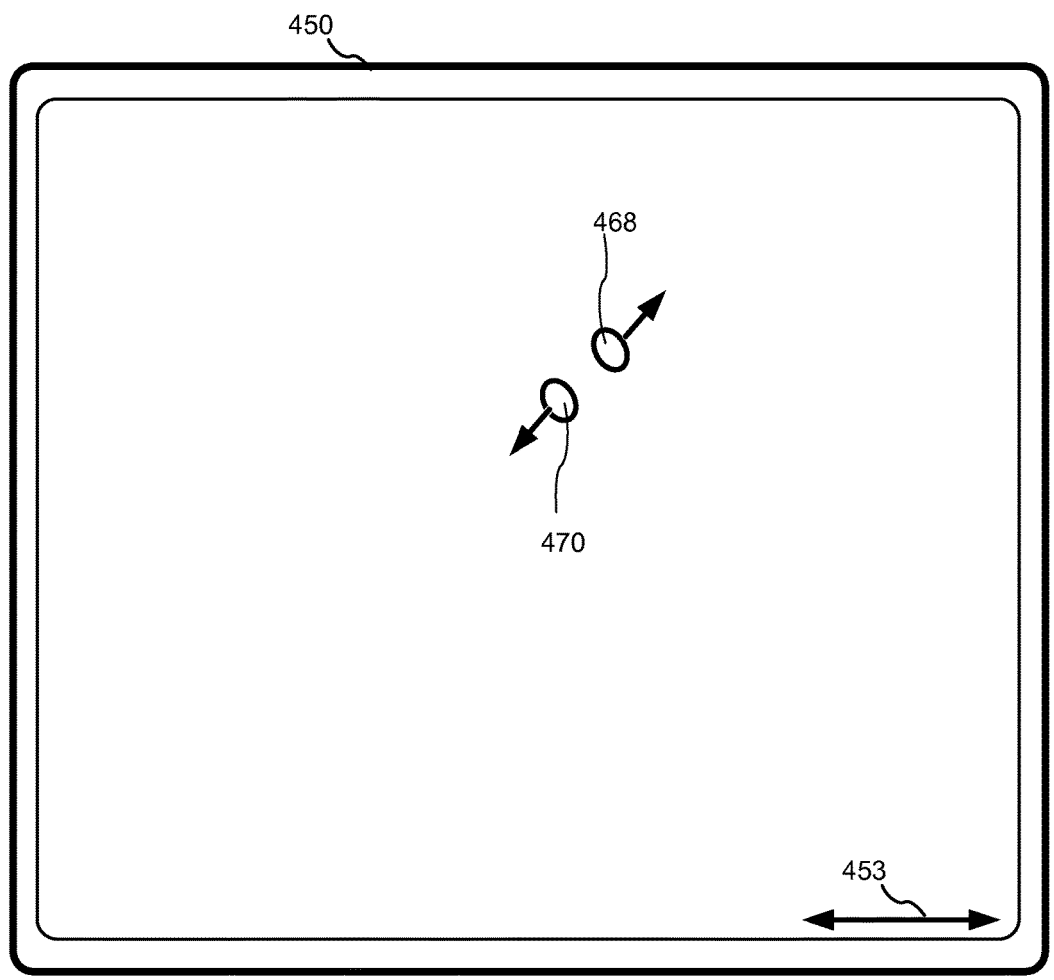
FIG. 4B illustrates an exemplary user interface for a multifunction device with a touch-sensitive surface that is separate from the display in accordance with some embodiments.
Figure 4B:
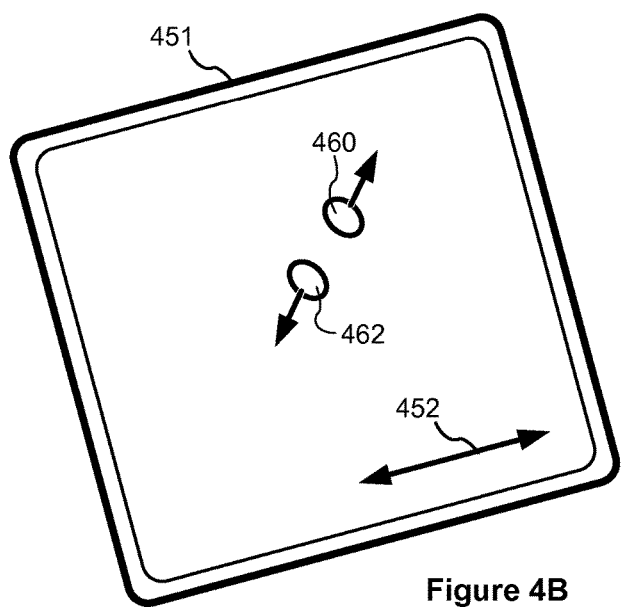

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

It should be understood that, in some embodiments, one or more of the finger inputs are replaced with input from another input device (e.g., a mouse based input or stylus input), or vice versa. For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact).

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5S illustrate exemplary user interfaces for manipulating content objects in documents in accordance with some embodiments. The user interfaces in these figures are used to illustrate the processes described below, including the processes in FIGS. 6A-6D, 7-8.

FIG. 5A illustrates documents 502 and 506 concurrently displayed on a display (e.g., display 340 of device 300 or touch screen 112 of device 100). Documents 502 and 506 may respectively be a word processing document, a web page, a spreadsheet, a presentation document, an electronic book, an email message, a text message, an instant message, or a text document, for example.

Document 502 includes content object 504 that is displayed, on display 340, in document 502. Exemplary content objects 504 include, without limitation, a digital image, an inline video, inline audio, text highlighted by a user, a graphic, or a file attachment.

Cursor 508 is also displayed on display 340, at a location over content object 504. In some embodiments, cursor 508 is a mouse cursor or pointer. Cursor 508 may be moved on display 340 in response to the detection of a cursor movement input (e.g., a mouse input, or a gesture on a touch-sensitive surface).

While cursor 508 is positioned at a location over content object 504, device 300 may detect a user input corresponding to a command. In FIG. 5A, while cursor 508 is positioned over content object 504, device 300 detects a user input that includes a click and drag input (not shown) made with mouse 350, which corresponds to a drag and drop command. If display 340 is touch-sensitive, the user input may include a tap and drag input on the touch-sensitive display instead of a click and drag input using mouse 350. In response to the detection of the click and drag input, cursor 508 moves in, for example, direction 510, and content object 504 or a representation of content object 504 is dragged in direction 510 (in this case, to a position in document 506). The dragging of content object 504 may be animated. FIG. 5B illustrates an instant in an animation showing representation 511 of content object 504 being dragged in direction 510 toward document 506.

Figure 5C:
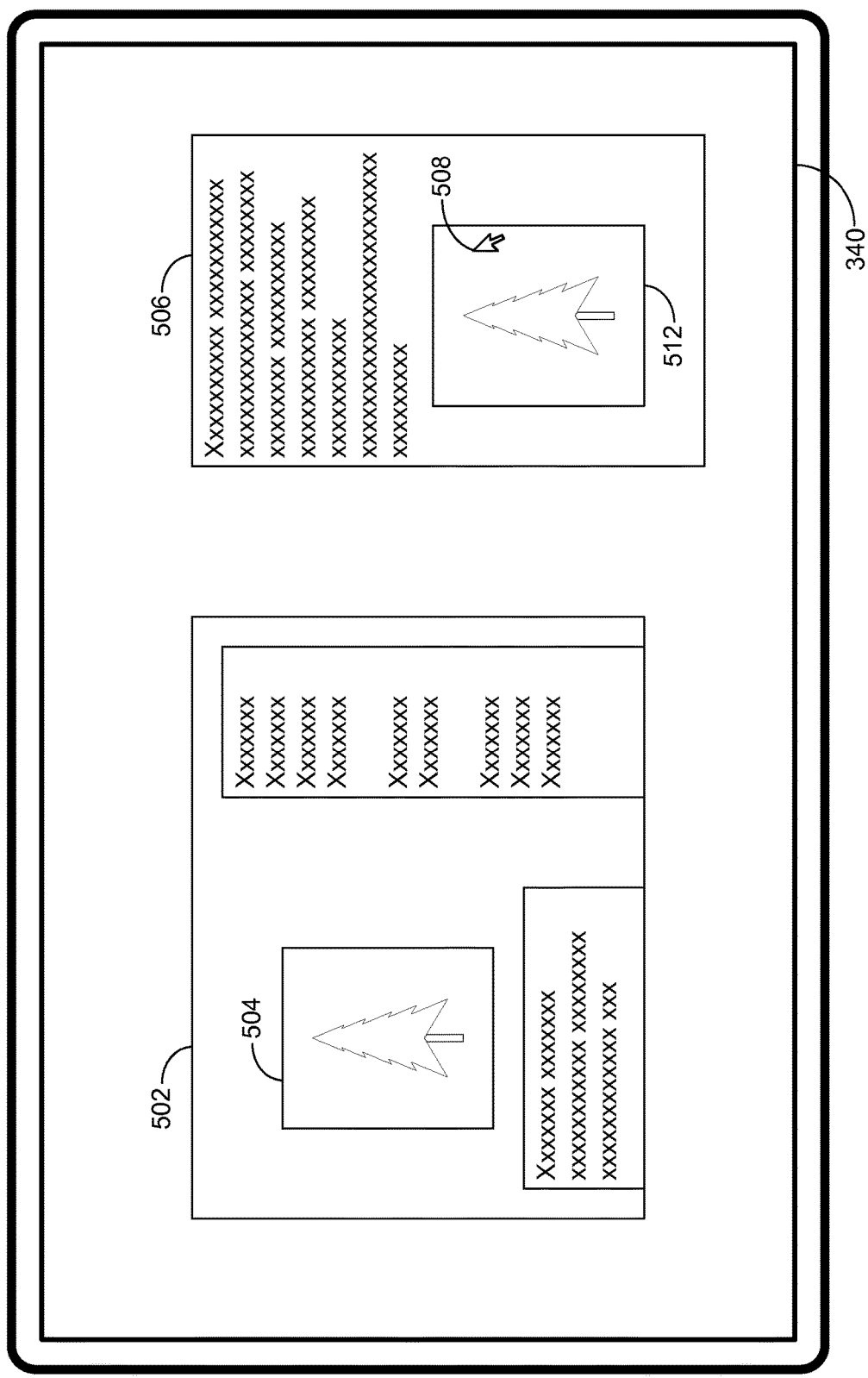

FIG. 5C shows a result of the response to the detection of the user input. When representation 511 is dragged to a position over document 506 and then the mouse click is released, copy 512 of content object 504 is created and displayed in document 506. In some embodiments, content object 504 may be removed from document 502 as well.

Figure 5D:
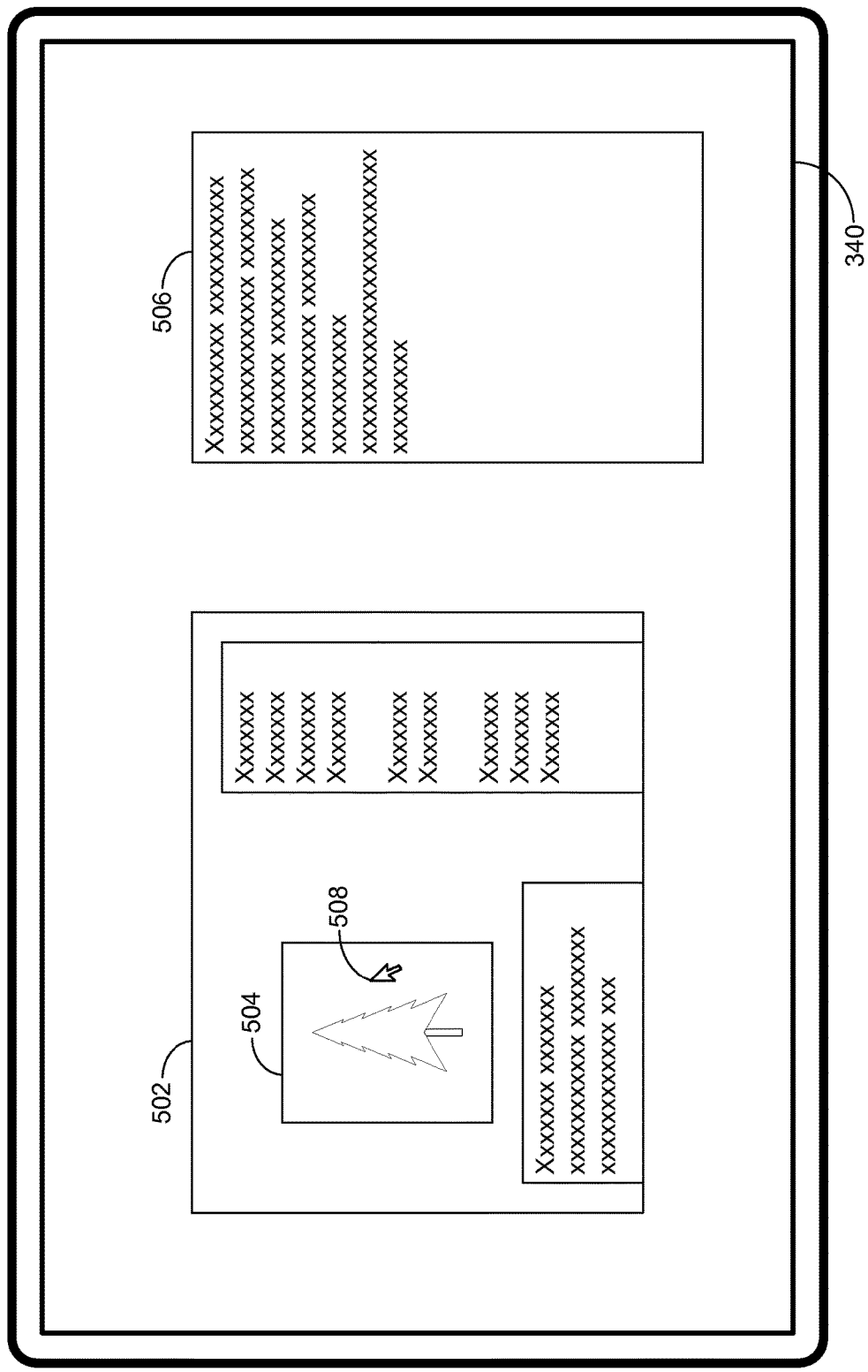
Figure 5E:
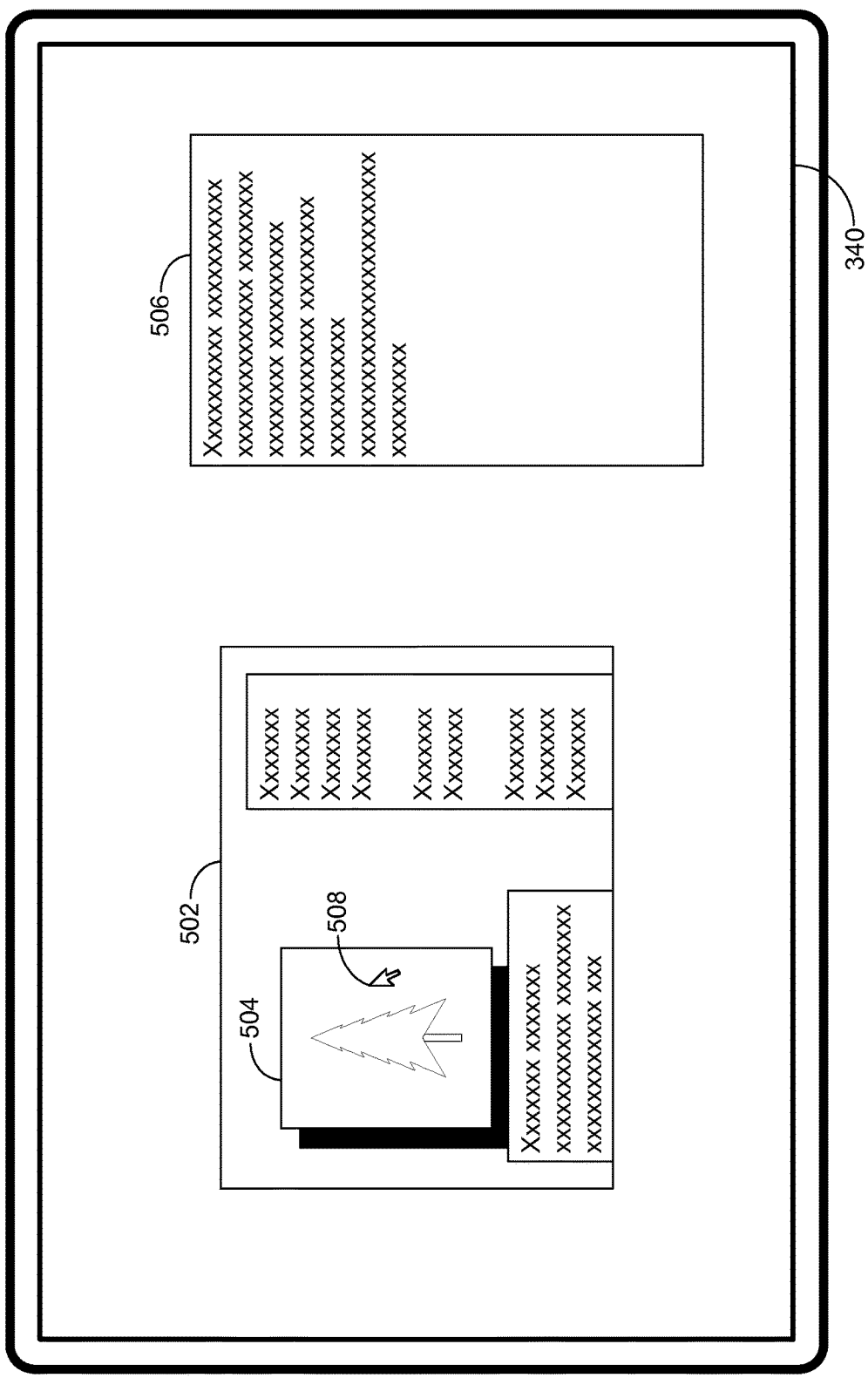

FIG. 5D illustrates cursor 508 positioned over content object 504, as in FIG. 5A. However, instead of detecting a user input that includes a click and drag input, device 300 detects a user input that includes a press and hold input (not shown) made with mouse 350. If display 340 is touch-sensitive, the user input may include a press and hold input on the touch-sensitive display instead of a press and hold input using mouse 350. In response to the detection of the press and hold input, content object 504 is selected and animated as separating from document 502. Also, as part of the animation, document 502 is visually deemphasized (e.g., by shading). FIG. 5E shows an instant in an animation of content object 504 separating from document 502, with a shadow forming "under" content object 504. As content object 504 separates from document 502, content object 504 may be displayed as being pulled from document 502.

Figure 5F:
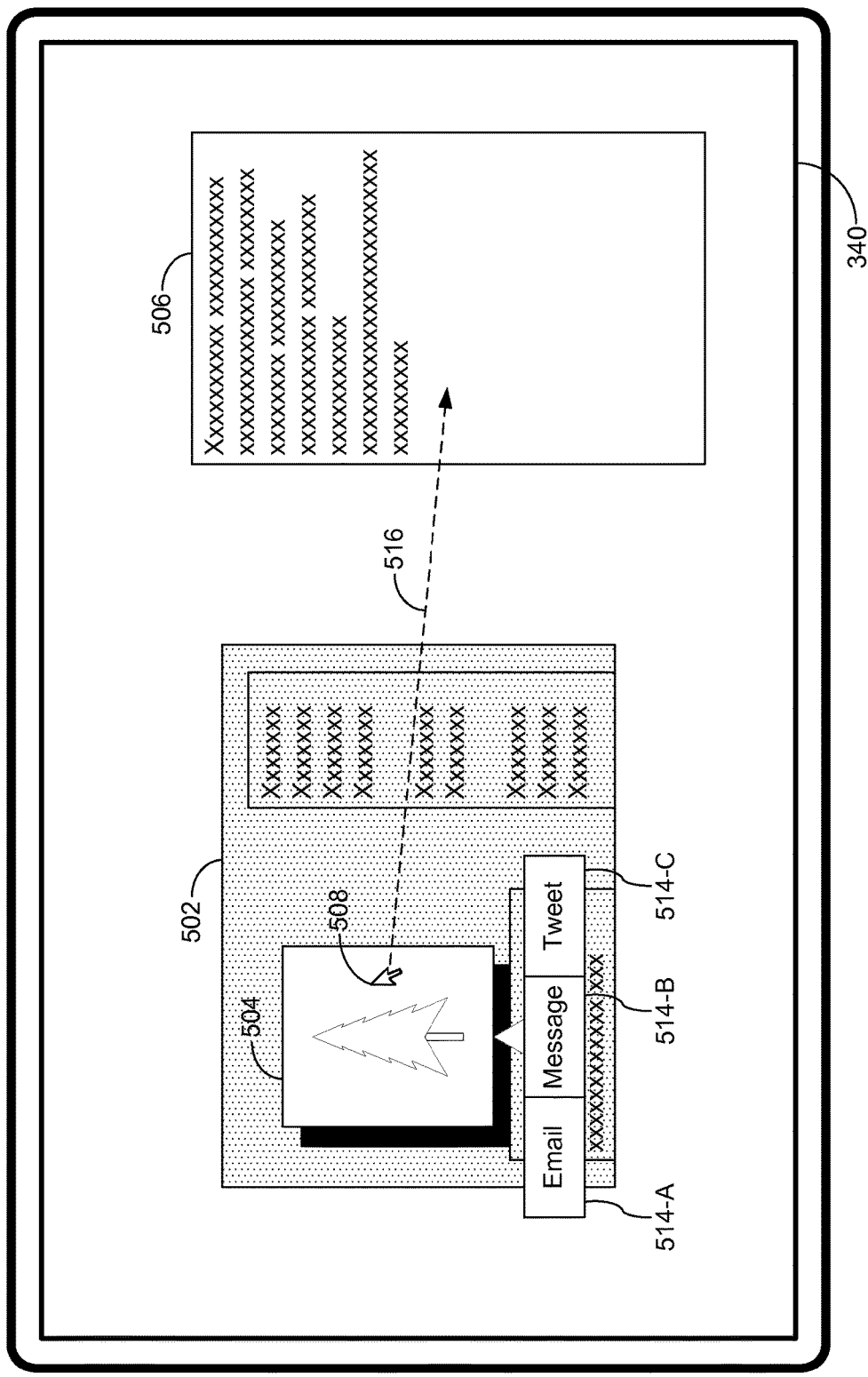

FIG. 5F illustrates the result of the response to the detection of the press and hold input. Content object 504 is displayed as separated from document 502, as if the plane of content object 504 is hovering over the plane of document 502. Document 502 is visually deemphasized (as indicated by the dotted background). Further, one or more icons 514 are displayed near content object 504 (in this case, just below content object 504). Icons 514 include icons for initiating displays of respective user interfaces for sending content object 504 to other users or otherwise sharing content object 504 with other users. Further details regarding icons 514 are described below.

Figure 5G:
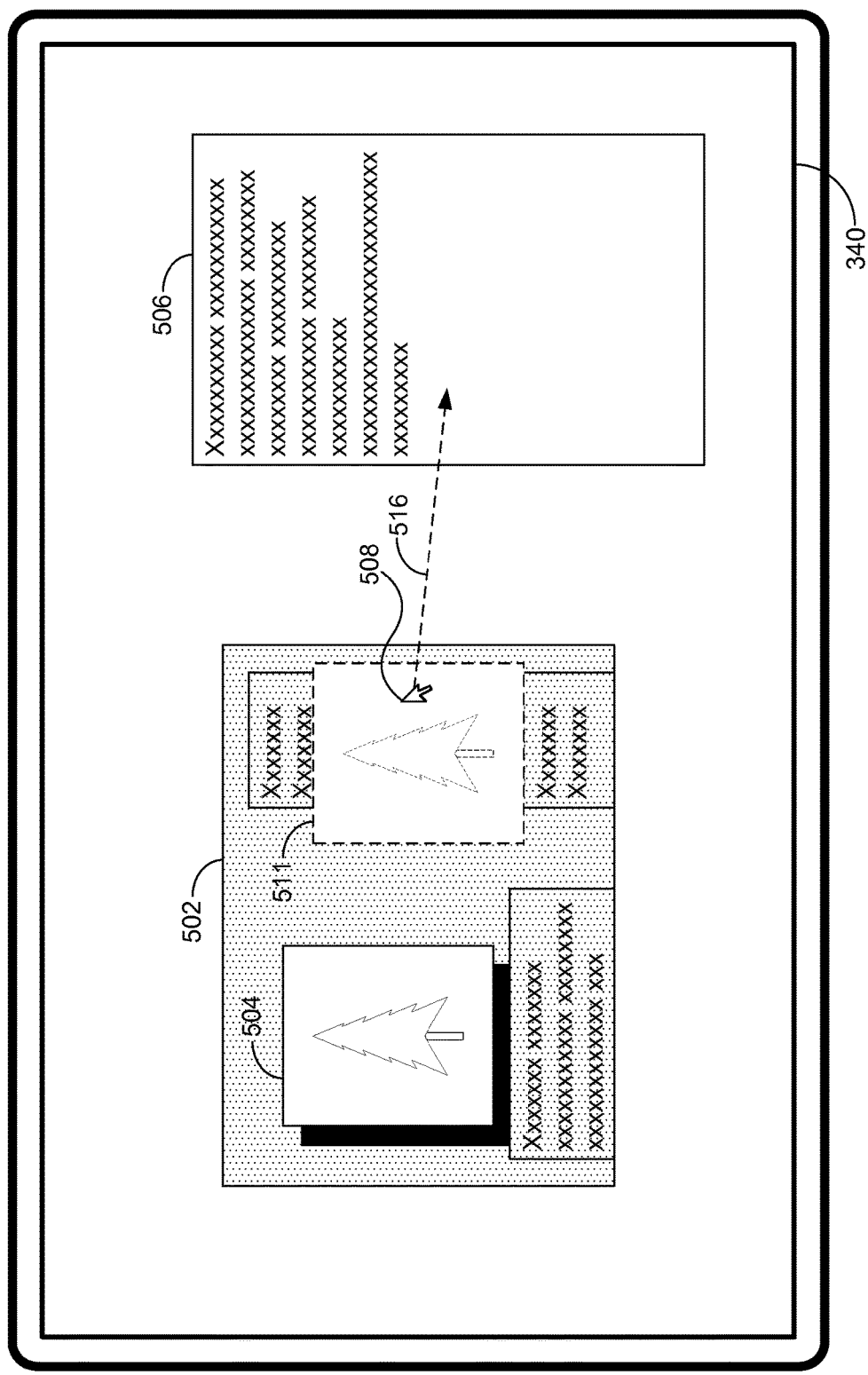
Figure 5H:
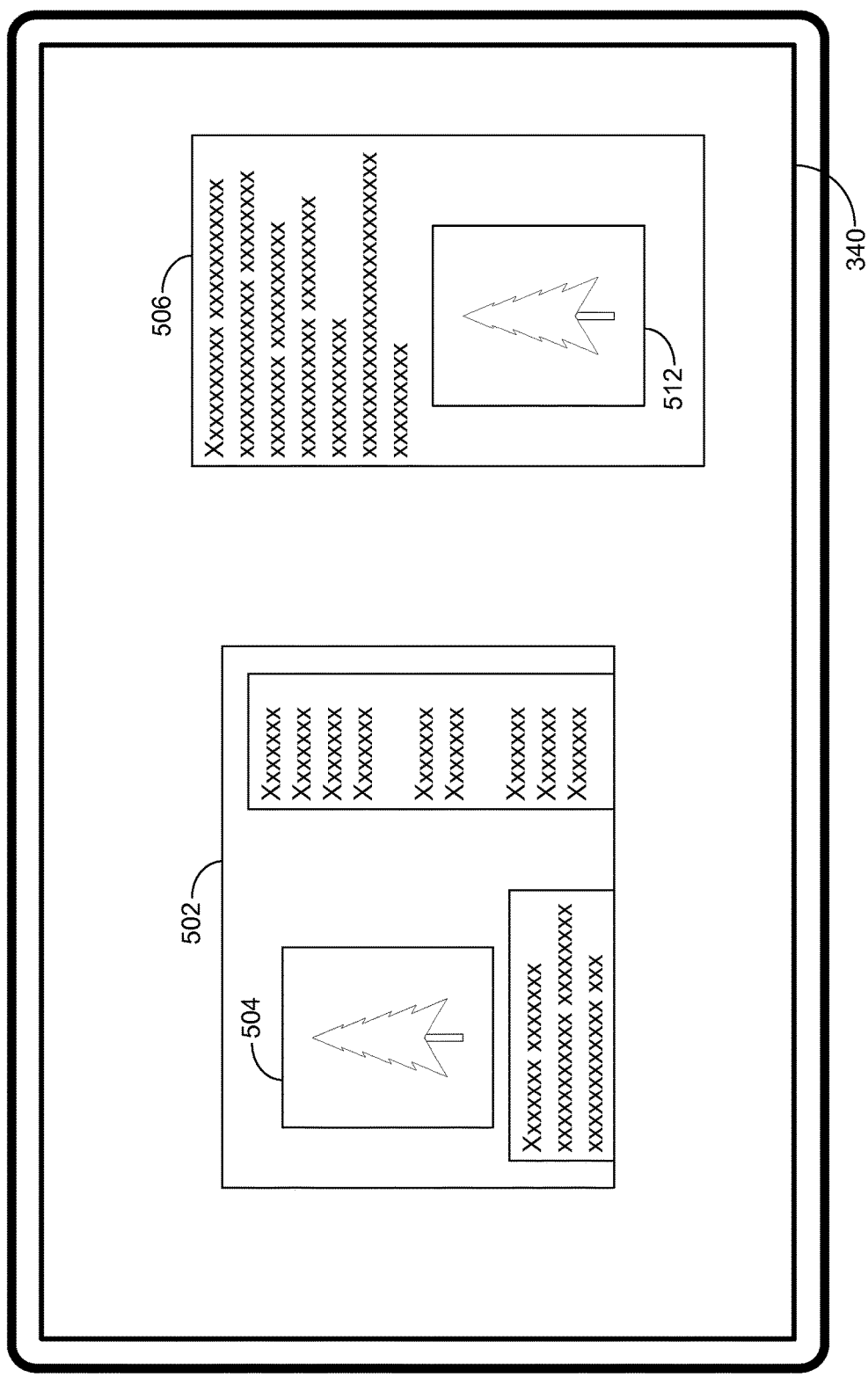

While content object 504 is separated from document 502, the user may cease the press and hold input that activated the separation, and other user inputs may be detected. FIG. 5F shows cursor 508 positioned over content object 504 (which is separated from document 502) as device 300 detects a user input (not shown) that includes a click and drag input corresponding to a drag and drop command to drag content object 504 in direction 516. In response to the detection of the user input, representation 511 of content object 504 is dragged in direction 516 (in this case, to a position in document 506), shown in FIG. 5G. Icons 514 cease to be displayed and document 502 ceases to be visually deemphasized, as shown in FIG. 5H. Content object 504 may cease to be separated from document 502 as well. When the user input is complete, copy 512 of content object 504 is created and displayed in document 506, as shown in FIG. 5H. Thus, if a user decides to move the content object to another electronic document, instead of sharing the content object with another user, the user interface seamlessly transitions from the interface for sharing the content object with other users (which includes icons 514 and the content object separated from document 502) to an interface for moving the content object to another document.

Figure 5I:
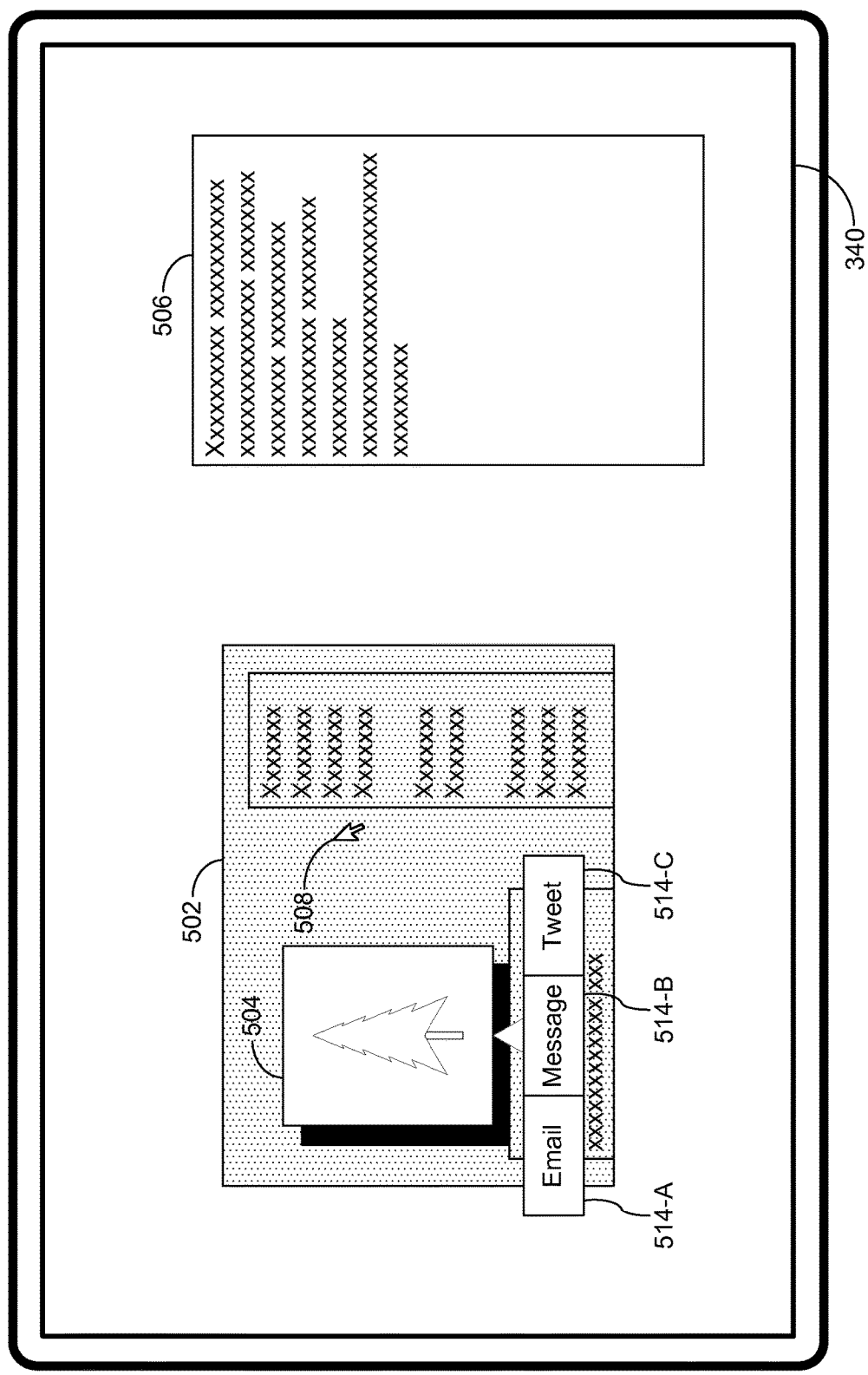
Figure 5J:
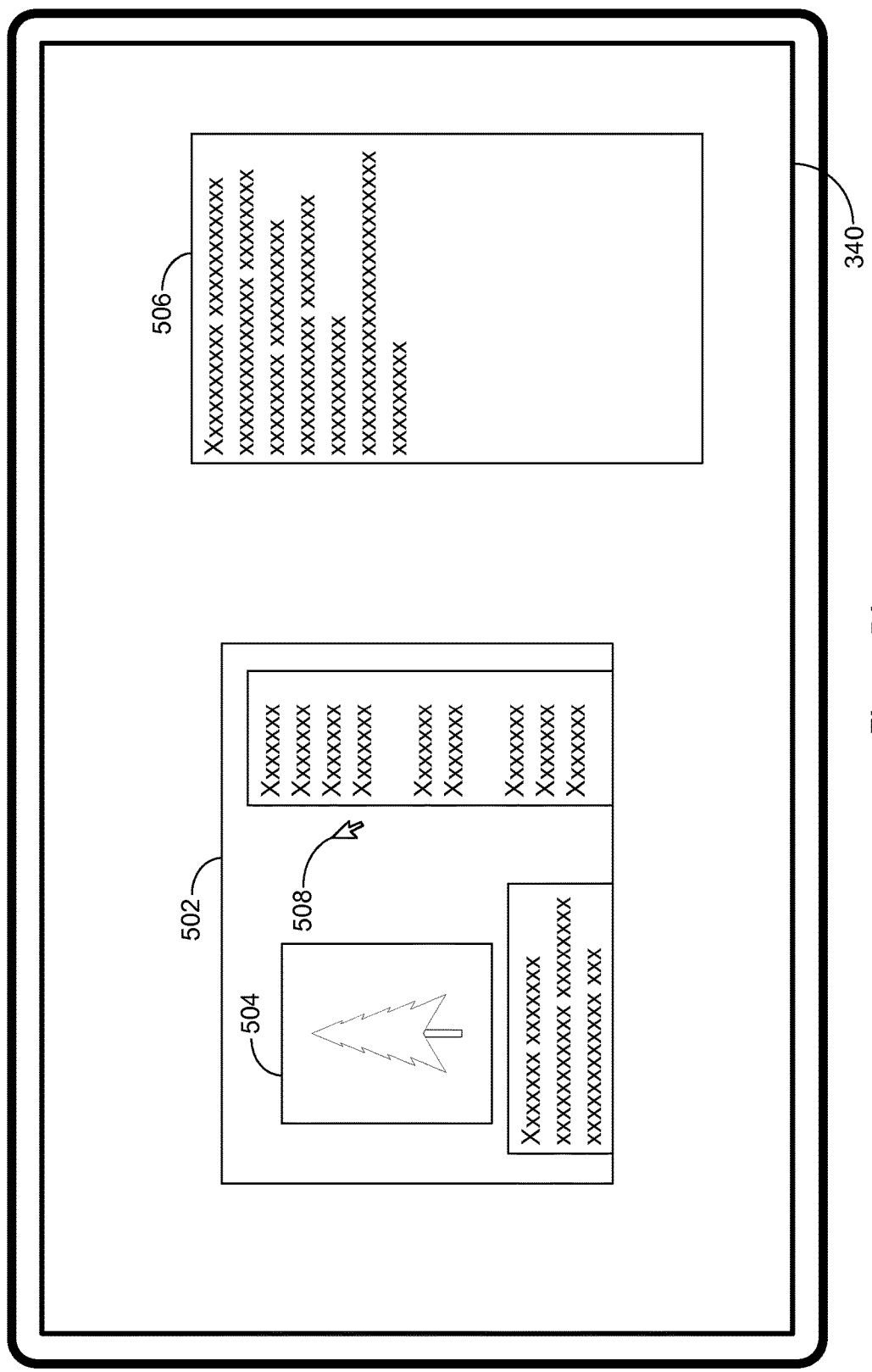

FIG. 5I shows content object 504 separated from document 502 and icons 514 displayed on display 340, as in FIG. 5F, but with cursor 508 positioned at a location away from content object 504 and icons 514. Device 300 detects a user input (e.g., a mouse button click while cursor 508 is positioned away from content object 504 and icons 514; a tap gesture at a location away from content object 504 and icons 514 (if display 340 is touch-sensitive)) (not shown). In response to the detection of the user input, content object 504 ceases to be separated from document 502, content object 504 is displayed at the same location as prior to its separation from document 502, icons 514 cease to be displayed, and document 502 ceases to be visually deemphasized, as shown in FIG. 5J.

Figure 5K:
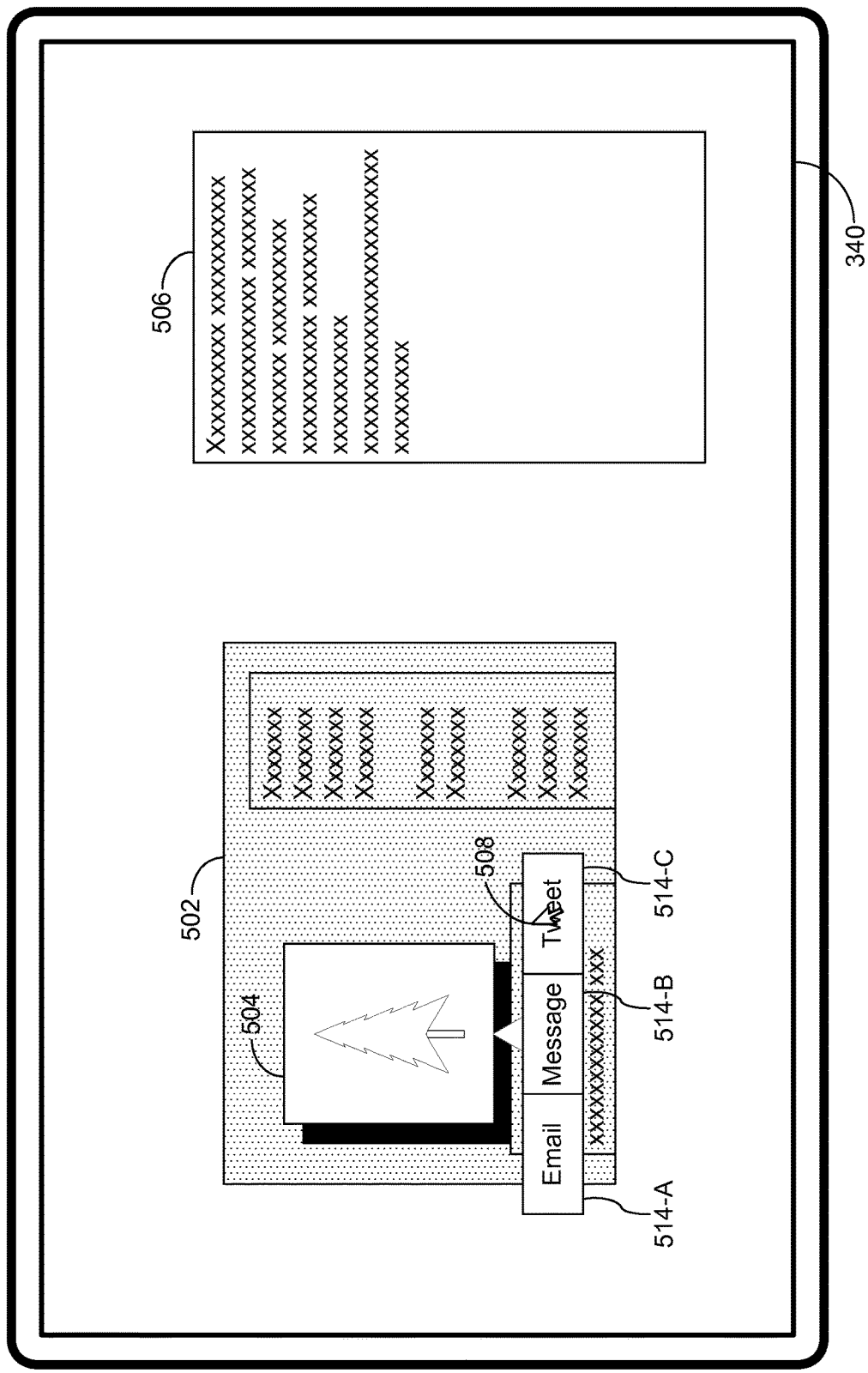

FIG. 5K shows content object 504 separated from document 502 and icons 514 displayed on display 340, as in FIG. 5F, but with cursor 508 positioned at a location over an icon 514. A respective icon 514 may be activated in response to detection of a user input (e.g., a mouse button click while cursor 508 is positioned over the respective icon 514; a tap gesture on the respective icon 514 (if display 340 is touch-sensitive)).

Figure 5L:
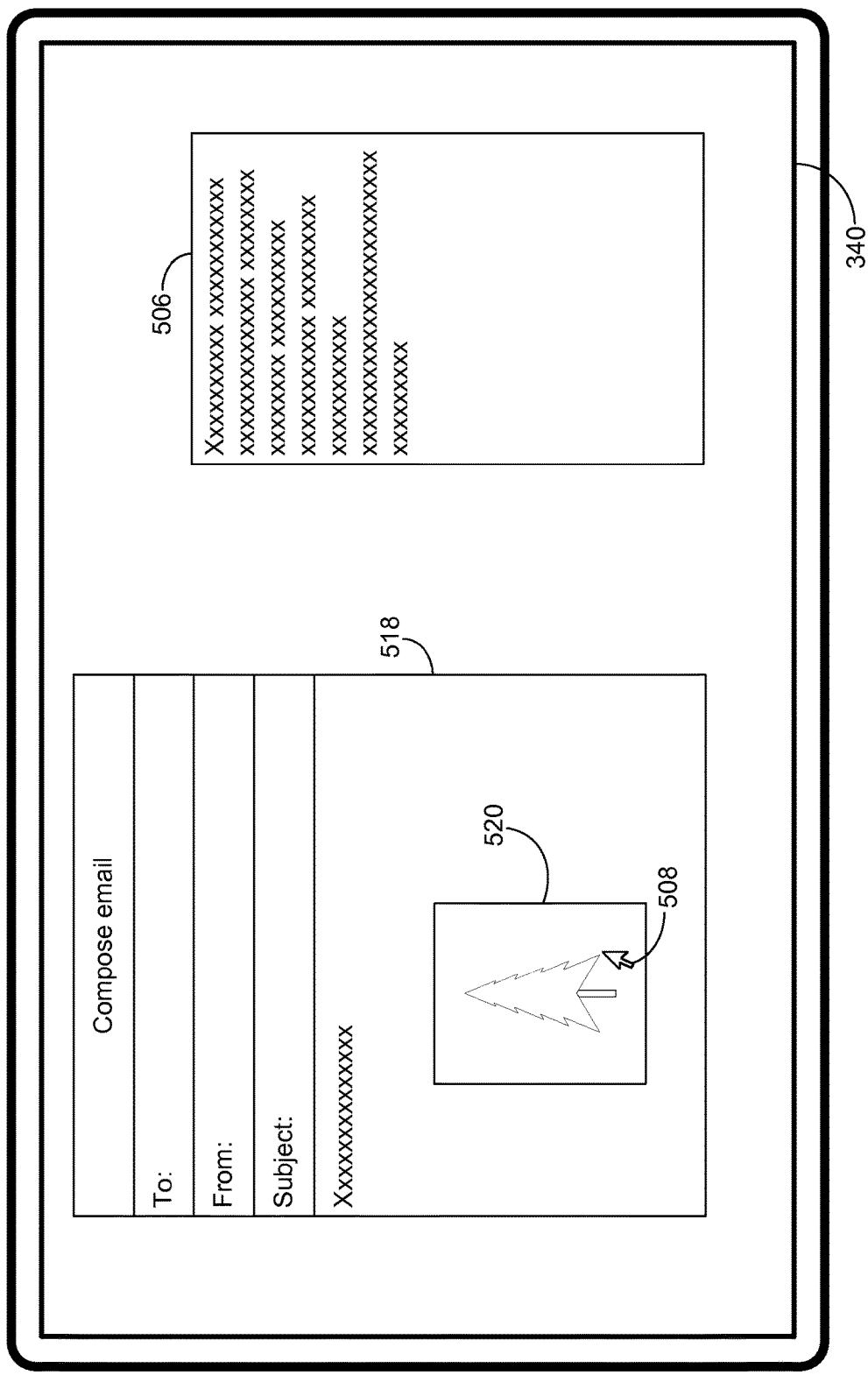

When icon 514-A is activated, display of an email composition user interface 518 is initiated, such as that shown in FIG. 5L. In email composition user interface 518, copy 520 of content object 504 is included inline or as an attachment in a draft email message that a user may edit (including specifying one or more recipients of the email message) and send.

Figure 5M:
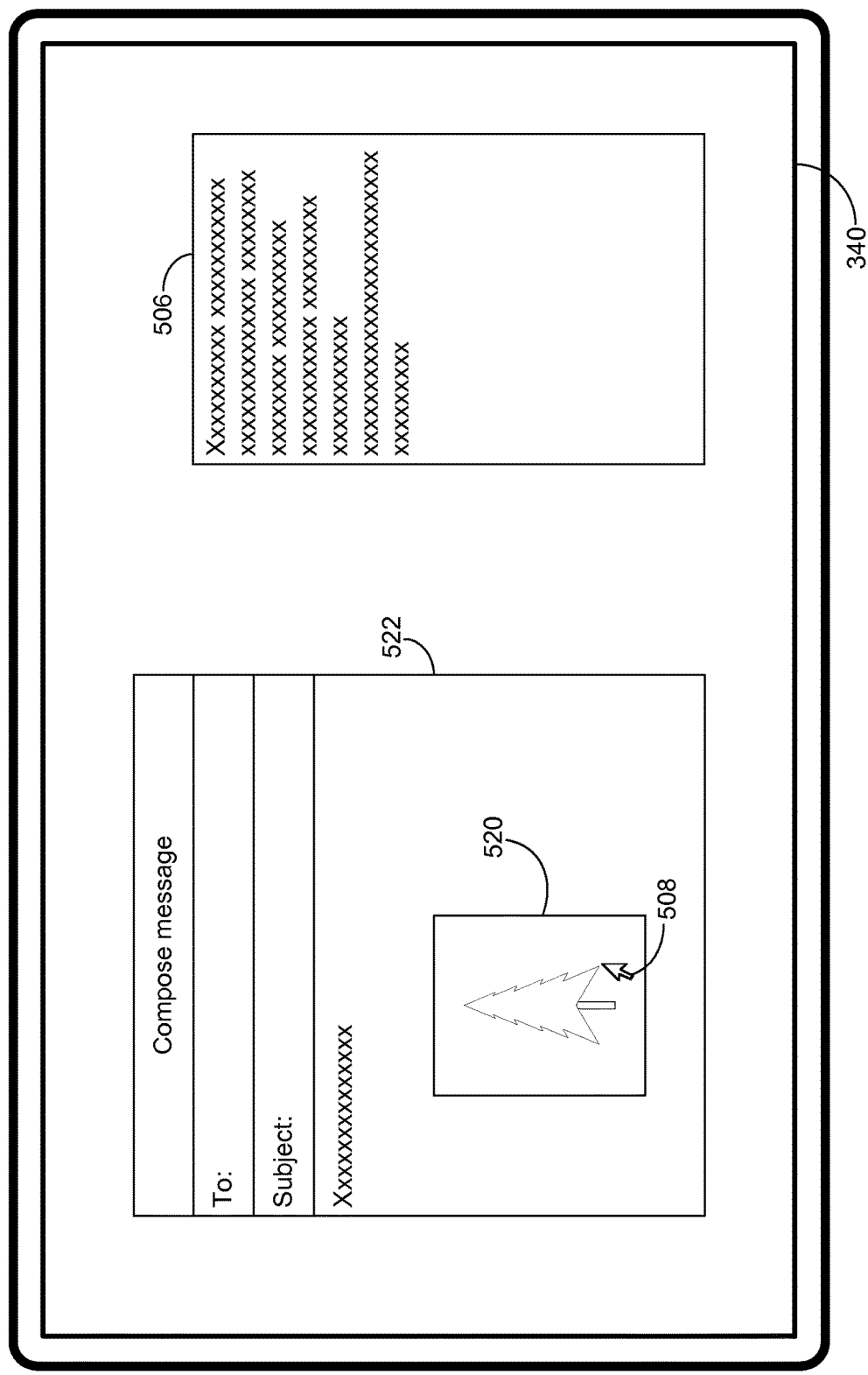

When icon 514-B is activated, display of a message composition user interface 522 is initiated, such as that shown in FIG. 5M. In message composition user interface 522, copy 520 of content object 504 is included inline or as an attachment in a draft message (e.g., text message, instant message, Multimedia Messaging Service (MMS) message) that a user may edit (including specifying one or more recipients of the message) and send.

Figure 5N:
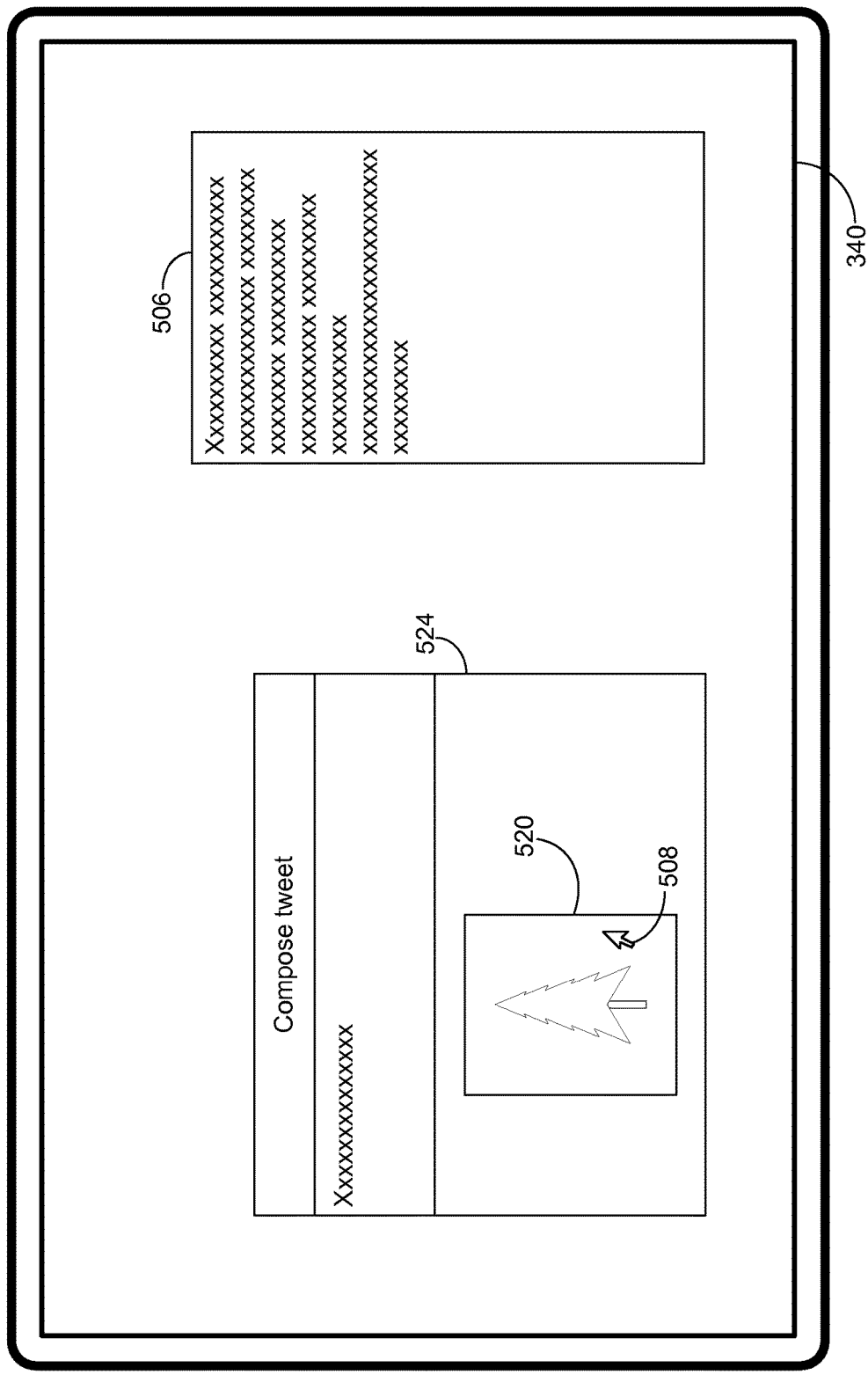

When icon 514-C is activated, display of a tweet composition user interface 524 is initiated, such as that shown in FIG. 5N. In tweet composition user interface 522, copy 520 of content object 504 is associated with a tweet message that a user may edit and post to a pre-specified Twitter™ account. If content object 504 is highlighted text from document 502, copy 520 (which is a copy of the highlighted text) is included in the text message. In some embodiments, if content object 504 is a non-text content object (e.g., an image), copy 520 is uploaded to a pre-specified hosting service (e.g., image hosting service, video hosting service) and a link to copy 520 at the hosting service is included in the tweet.

It should be appreciated that email, message, and tweet are merely examples of ways that content object 504 may be sent to other users or shared with other users in accordance with the embodiments described herein. Other possible ways include posting to a social network service, a blog, or to a message board, to name just a few examples.

Figure 5O:
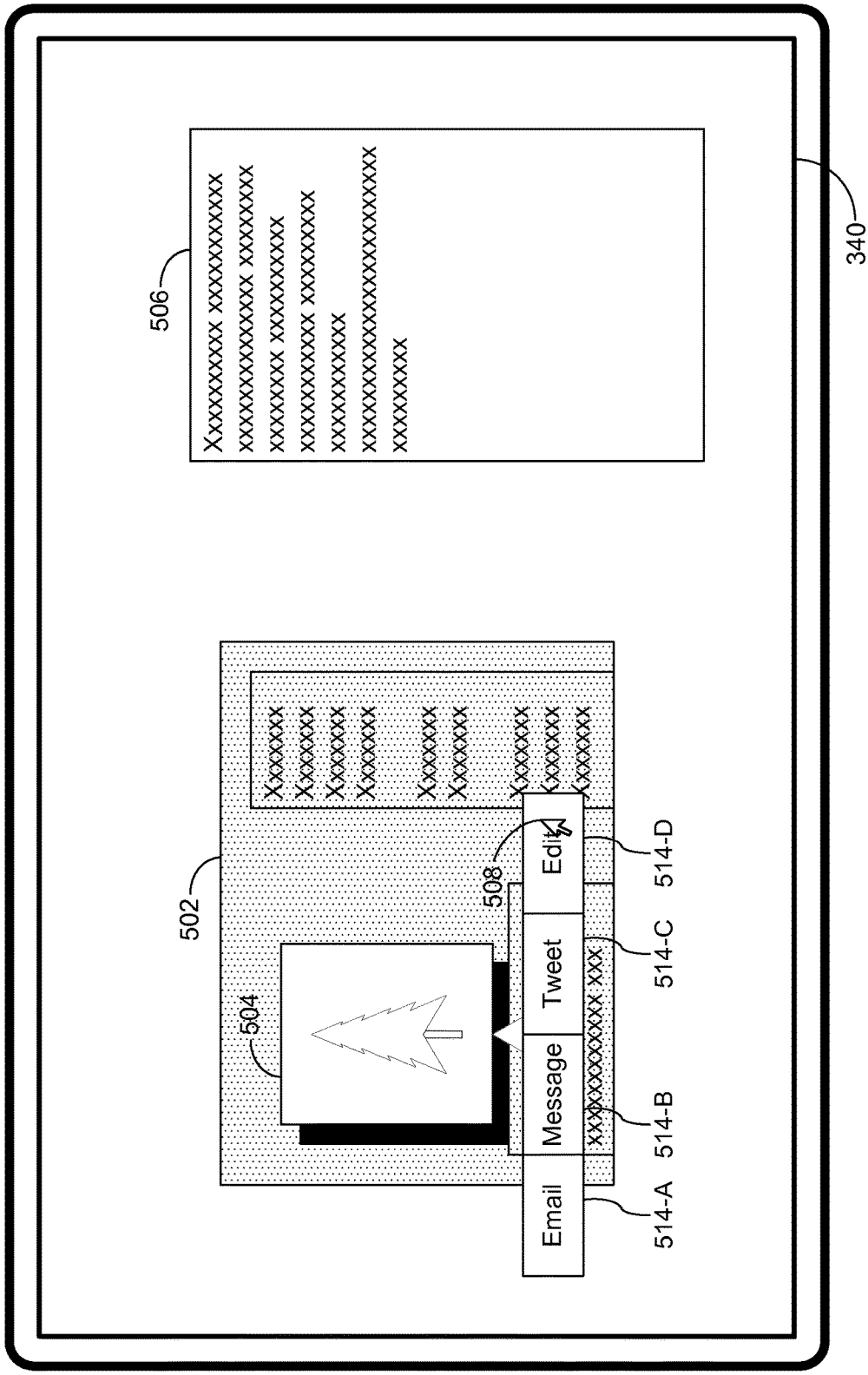

FIG. 5O shows content object 504 separated from document 502 and icons 514 displayed on display 340, as in FIG. 5F, but with icons 514 including an additional icon 514-D. Cursor 508 is shown as positioned over icon 514-D. In response to detection of a user input (e.g., a mouse button click while cursor 508 is positioned over icon 514-D; a tap gesture on icon 514-D (if display 340 is touch-sensitive)), content object 504 is displayed in an editing mode, as shown in FIG. 5P.

Figure 5P:
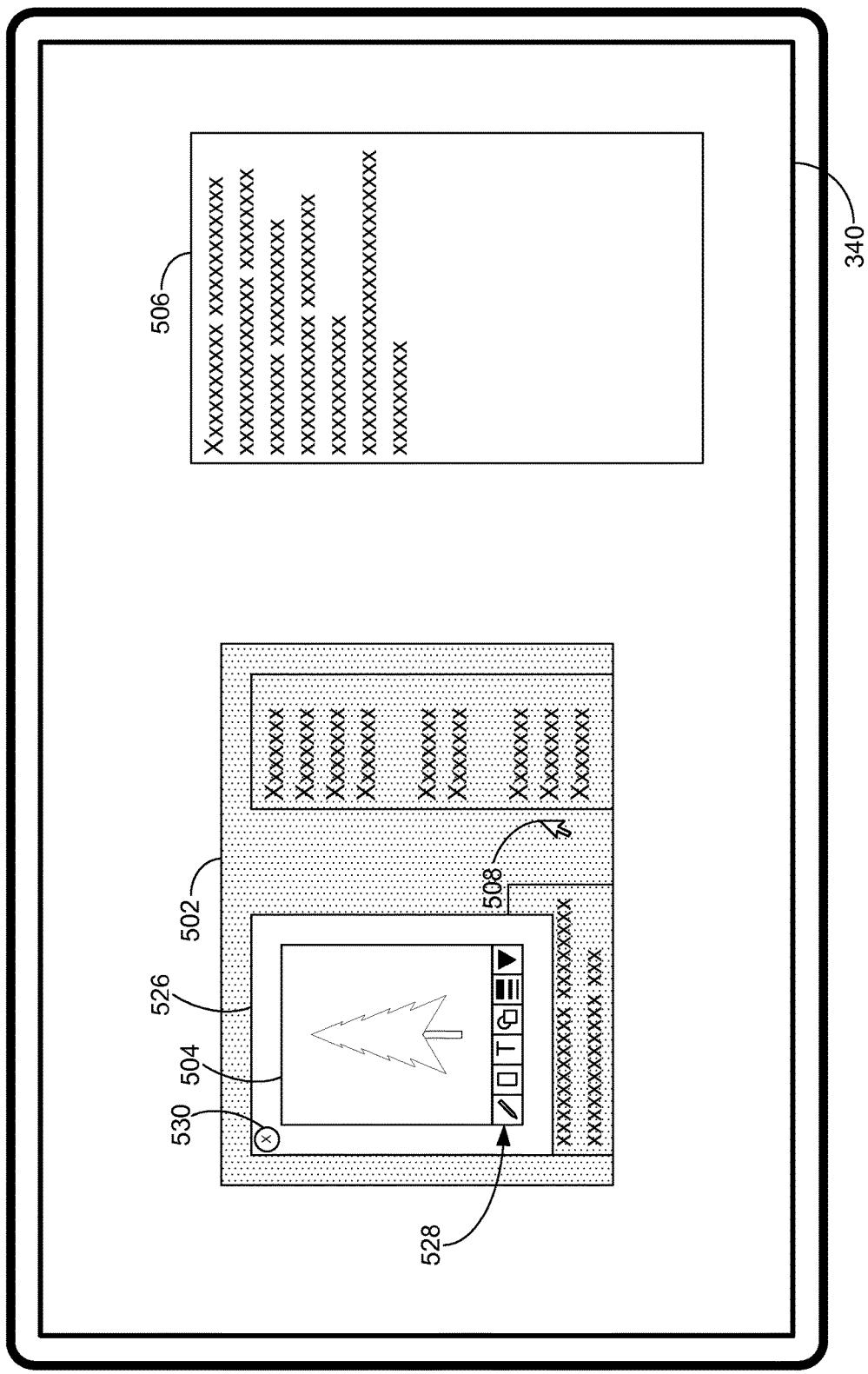

In FIG. 5P, content object 504 is displayed in an editing mode, as indicated by area 526 that is displayed on display 340 around content object 504. Area 526 includes one or more icons 528 that correspond to respective editing operations or functionality. The operations or functionality to which respective icons 528 correspond may include, for example, a pen/brush functionality for drawing on content object 504, an eraser functionality for removing markings drawn on content object 504, a text functionality for adding text to content object 504, a shape functionality for drawing shapes on content object 504, a pen/brush thickness functionality, and a pen/brush color functionality.

Area 236 also includes icon 530 that, when activated, ends the editing mode, at which point border area 526 ceases to be displayed. Content object 504 remains separated from document 502 and maintains any markings added onto content object 504 or other edits. Icons 514 are also redisplayed. When a respective icon 514 is activated, a copy of the content object 504 as edited is included in the resulting email, message, or tweet.

Figure 5Q:
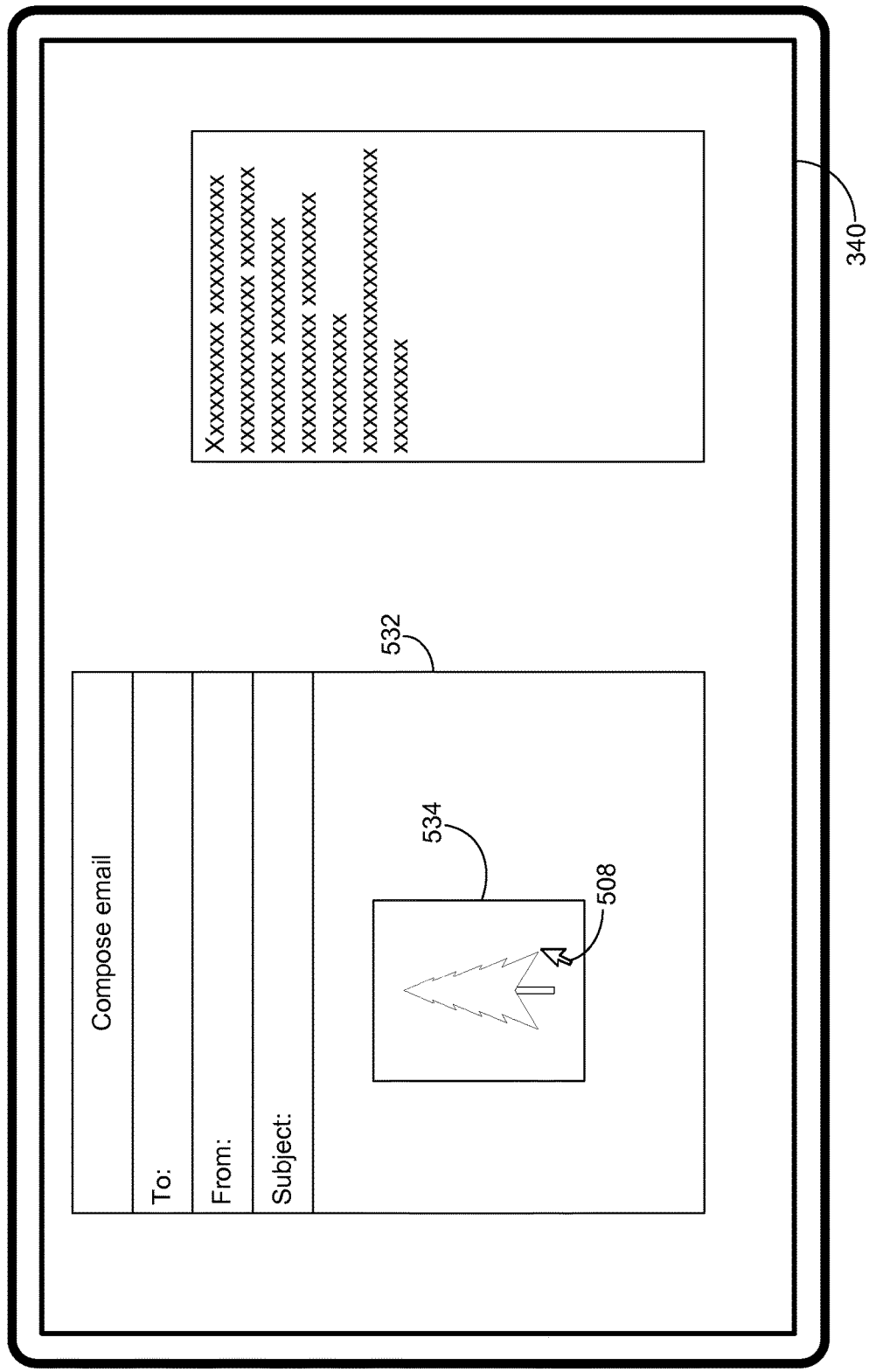
Figure 5R:
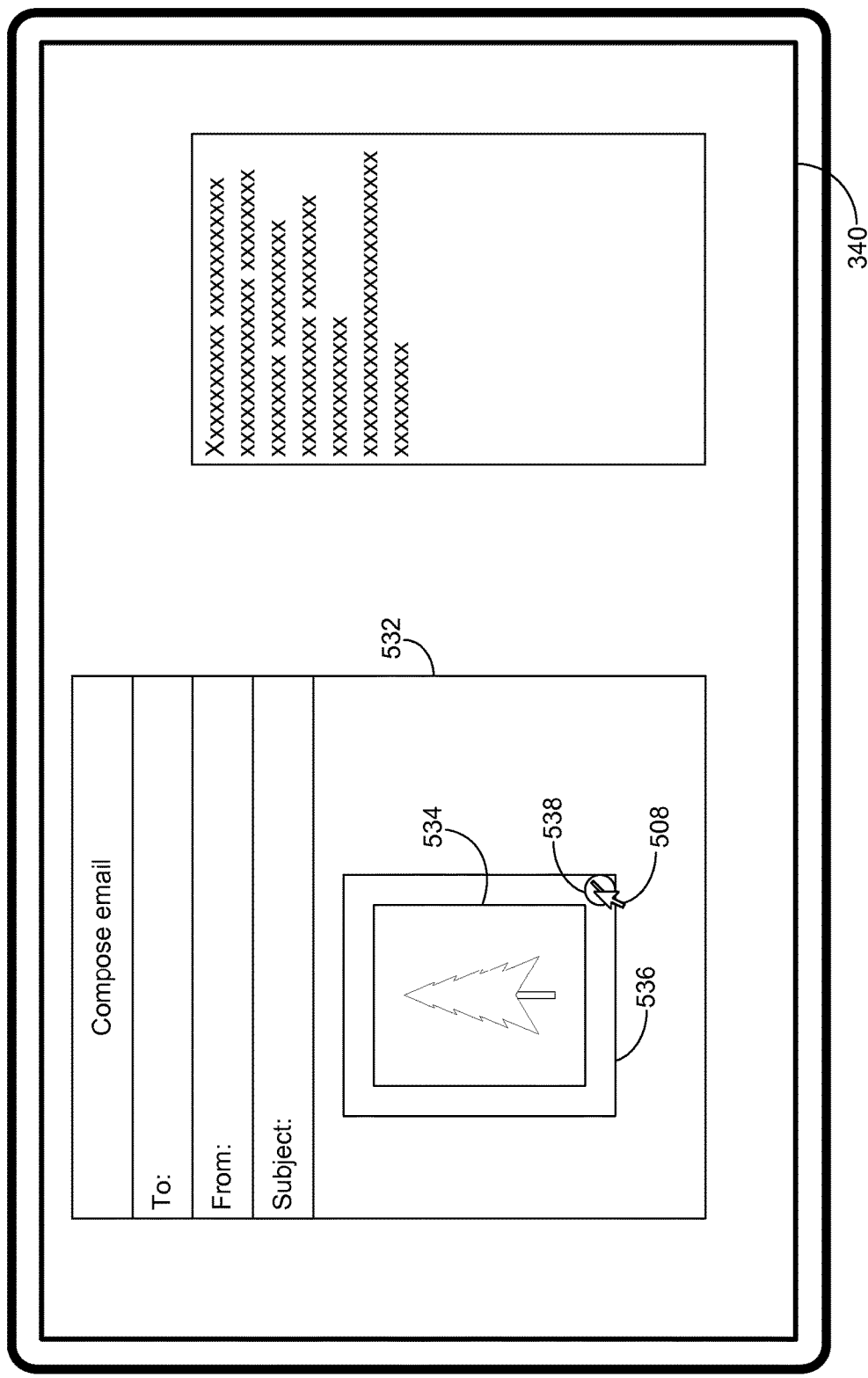
Figure 5S:
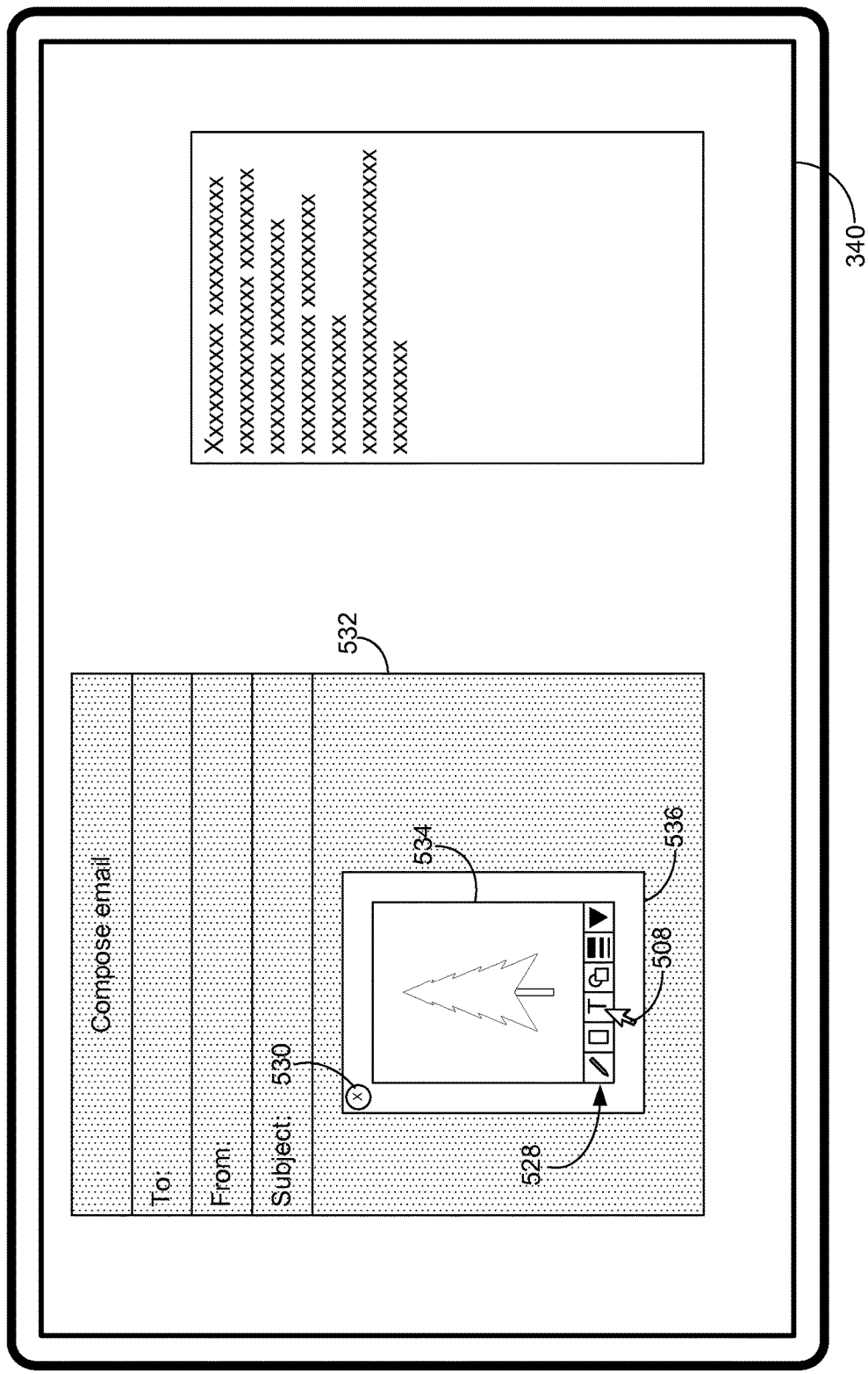
Figure 6A:
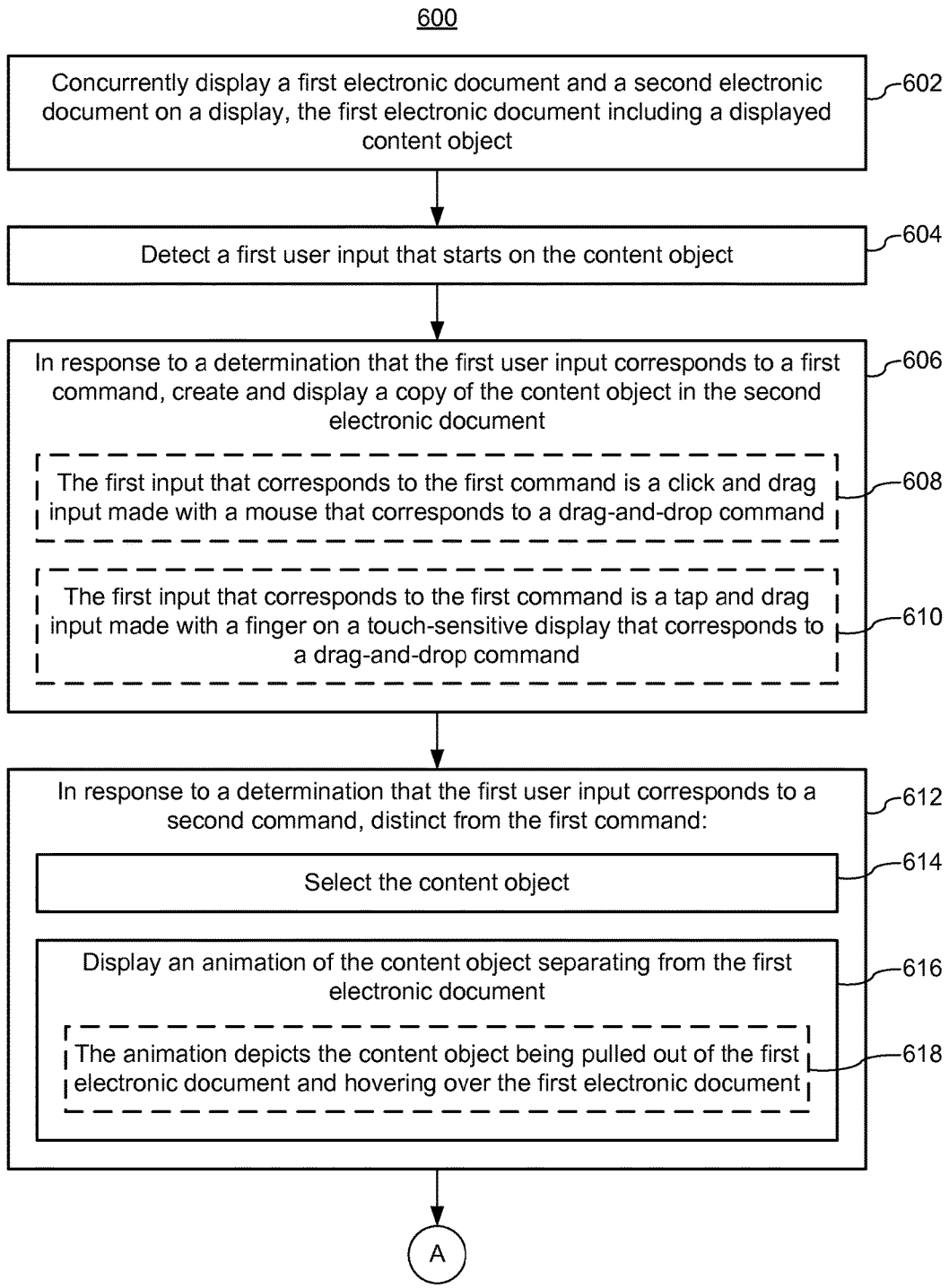
FIGS. 6A-6D are flow diagrams illustrating a method of sharing a content object in a document in accordance with some embodiments.
Figure 6B:
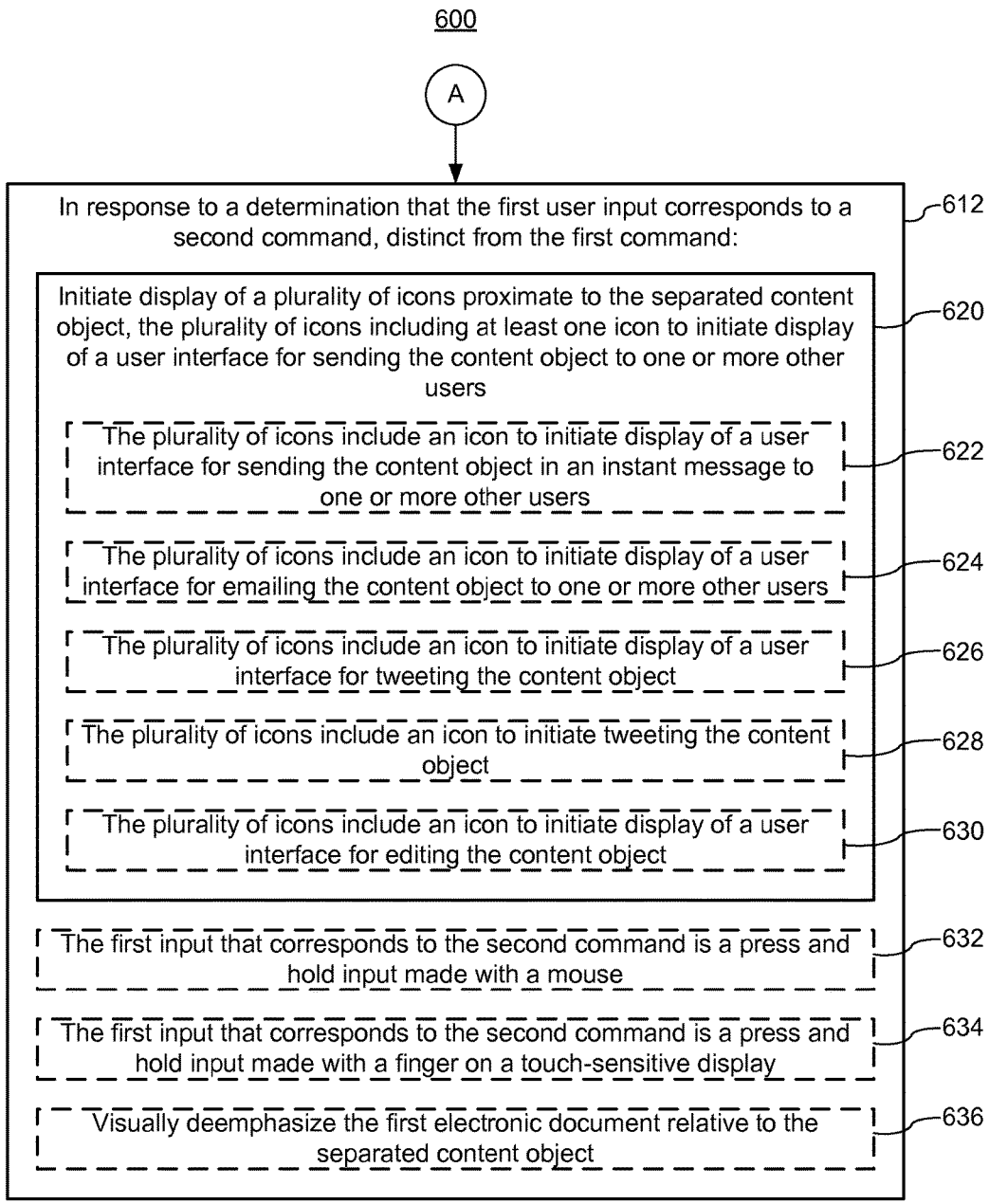
Figure 6C:
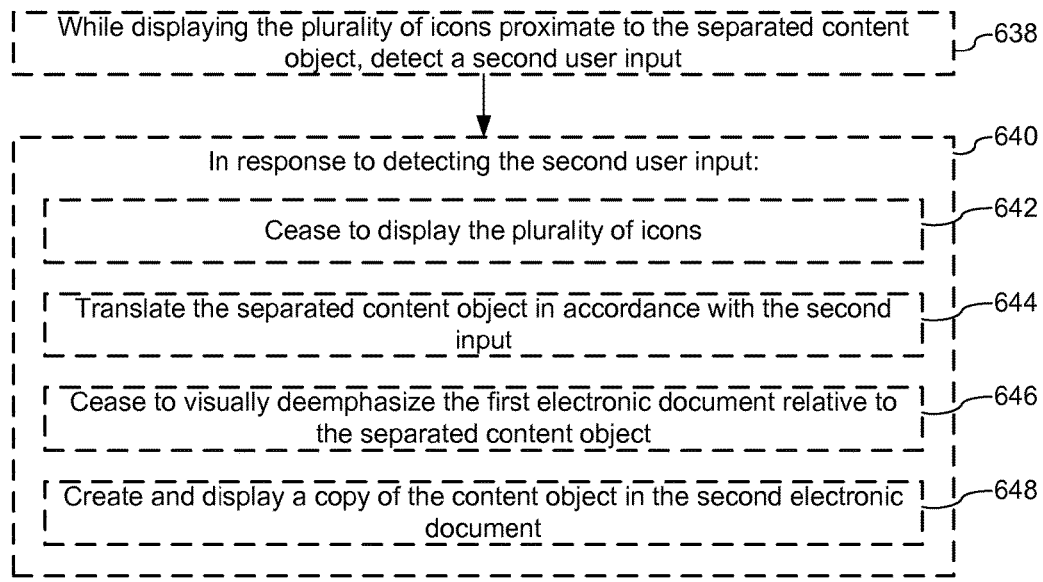
Figure 6C:
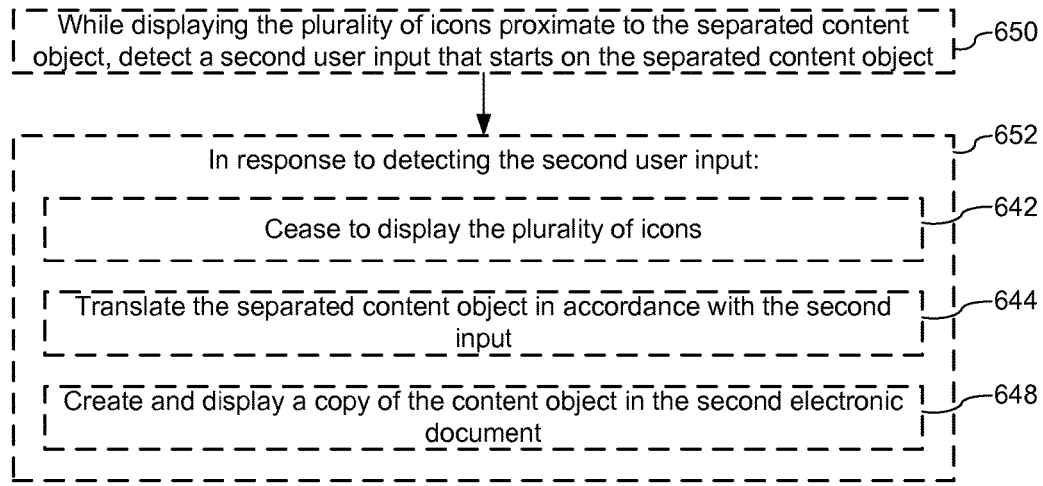
Figure 6D:
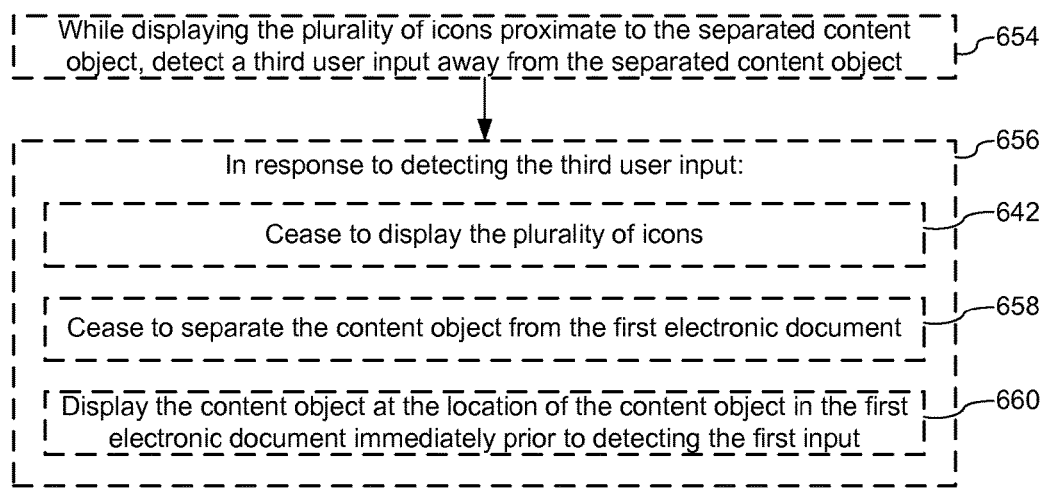

FIG. 5Q illustrates email message composition interface 532 displayed on display 340. The message being composed in email message composition interface 532 includes content object 534. Cursor 508 is positioned over content object 534. While cursor 508 is positioned over content object 534, a user input that includes a press and hold input may be detected. In response to detection of the user input, area 536 is displayed around content object 534, as shown in FIGS. 5R and 5S. In some embodiments, in response to the press and hold input, an icon for entering an editing mode is displayed, such as icon 538 in FIG. 5R. In some other embodiments, in response to the press and hold input (FIG. 5Q), an editing mode interface is displayed such as that shown in FIG. 5S, without display of the icon for entering an editing mode (e.g., without displaying FIG. 5R between the display of FIG. 5Q and FIG. 5S).

Area 536 includes icon 538, over which cursor 508 may be positioned. In response to detection of a user input activating icon 538 (e.g., a mouse button click while cursor 508 is positioned over icon 538; a tap gesture on icon 538 (if display 340 is touch-sensitive)), content object 534 is displayed in an editing mode, as shown in FIG. 5S. In some other embodiments, icon 538 is displayed overlaid on or adjacent to content object 534 in FIG. 5Q (not shown), and in response to detection of a user input activating icon 538 (e.g., a mouse button click while cursor 508 is positioned over icon 538; a tap gesture on icon 538 (if display 340 is touch-sensitive)), content object 534 is displayed in an editing mode, as shown in FIG. 5S.

While content object 534 is displayed in the editing mode, area 536 is displayed around content object 534. Area 536 includes editing functionality icons 528 and editing mode end icon 530, which are described above with reference to FIG. 5P. When the editing mode ends, content object 534 in the email message retains the edits made while in editing mode.

FIGS. 6A-6D are flow diagrams illustrating a method 600 of sharing a content object in a document in accordance with some embodiments. The method 600 is performed at an electronic device (e.g., device 300, FIG. 3, or portable multifunction device 100, FIG. 1) with a display and optionally a touch-sensitive surface. In some embodiments, the display is a touch screen display and the touch-sensitive surface is on the display. In some embodiments, the display is separate from the touch-sensitive surface. In Some operations in method 600 may be combined and/or the order of some operations may be changed.

As described below, the method 600 provides an intuitive way to share a content object in a document. The method reduces the cognitive burden on a user when sharing content objects in a document, thereby creating a more efficient human-machine interface. For battery-operated electronic devices, enabling a user to share content objects in a document faster and more efficiently conserves power and increases the time between battery charges.

The device concurrently displays (602) a first electronic document (e.g., a web page, word processing document, presentation document, spreadsheet, electronic book, an email message, a text message, an instant message, or a text document) and a second electronic document (e.g., a web page, word processing document, presentation document, spreadsheet, electronic book, an email message, a text message, an instant message, or a text document) on the display. The first electronic document includes a displayed content object (e.g., a digital image, an inline video, inline audio, text highlighted by a user, or a file attachment). FIG. 5A, for example, shows documents 502 and 506 displayed on display 340. Document 502 includes content object 504 that is also displayed.

The device detects (604) a first user input that starts on the content object. The first input may be detected while cursor 508 is positioned over content object 504, as shown in FIG. 5A, for example.

In response to a determination that the first user input corresponds to a first command (e.g., a drag-and-drop command), the device creates and displays (606) a copy of the content object in the second electronic document. For example, as shown in FIGS. 5A-5C, when the detected user input includes an input that corresponds to a drag-and-drop command dragging content object 504 to document 506, copy 512 of content object 504 is created in document 506.

In some embodiments, the first input that corresponds to the first command is a click and drag input made with a mouse that corresponds to a drag-and-drop command (608). In FIGS. 5A-5C, the user input may include a click and drag input that is performed using a mouse, which is initiated while cursor 508 is positioned over content object 504.

In some embodiments, the first input that corresponds to the first command is a tap and drag input made with a finger on a touch-sensitive display that corresponds to a drag-and-drop command (610). For example, if display 340 is a touch-sensitive display, the user input that corresponds to a drag-and-drop command on content object 504 may be performed with a finger touching content object 504 and then moving the finger on display 340.

In response to a determination that the first user input corresponds to a second command, distinct from the first command (612), the device selects (614) the content object, displays (616) an animation of the content object separating from the first electronic document, and initiates (620) display of a plurality of icons proximate (e.g., adjacent) to the separated content object, the plurality of icons including at least one icon to initiate display of a user interface for sending the content object to one or more other users. For example, as shown in FIGS. 5D-5F, when the detected user input includes a press and hold input on content object 504, content object 504 is selected and an animation showing content object 504 separating from document 502 is displayed. Also, icons 514 are displayed near content object 504. Icons 514 includes respective icons for initiating display of respective user interfaces for sending or sharing content object 504 by email, message, or tweet. In some embodiments, just one icon to initiate display of a user interface for sending the content object to one or more other users is displayed proximate to the separated content object, instead of a plurality of icons.

In some embodiments, the animation depicts the content object being pulled out of the first electronic document and hovering over the first electronic document (618). In some embodiments, the content object hovers over its prior location in the first electronic (i.e., its location in the first electronic document immediately prior to being pulled out of the first electronic document). When the separation of content object 504 from document 502 is animated (FIGS. 5D-5F), the separation may appear as if content object 504 is pulled out of document 502, with the end result being an appearance of content object 504 hovering over its original location in document 502 (FIG. 5F).

In some embodiments, the plurality of icons includes an icon to initiate display of a user interface for sending the content object in an instant message to one or more other users (622). Icons 514 (FIG. 5F), for example, may include icon 514-B to initiate display of email composition user interface 518 (FIG. 5M) for composing an instant message that includes content object 504 or a copy 520 of content object 504.

In some embodiments, the plurality of icons includes an icon to initiate display of a user interface for emailing the content object to one or more other users (624). Icons 514 (FIG. 5F), for example, may include icon 514-A to initiate display of message composition user interface 522 (FIG. 5L) for composing an email that includes content object 504 or a copy 520 of content object 504.

In some embodiments, the plurality of icons includes an icon to initiate display of a user interface for tweeting the content object (626). Icons 514 (FIG. 5F), for example, may include icon 514-C to initiate display of tweet composition user interface 524 (FIG. 5N) for composing a tweet that includes content object 504 or a copy 520 of content object 504 (or a link to either, stored at a hosting service).

In some embodiments, the plurality of icons includes an icon to initiate tweeting the content object (628). Icon 514-C (FIG. 5F) may, in lieu of initiating display of tweet composition user interface 524 (FIG. 5N), may initiate direct tweeting of content object 504 or a copy 520 of content object 504 (or a link to either, stored at a hosting service).

In some embodiments, the plurality of icons includes an icon to initiate display of a user interface for editing the content object (630). Icons 514 (FIG. 5O), for example, may include icon 514-D to initiate display of a user interface (e.g., an interface that includes icons 528, FIG. 5P) for editing content object 504.

In some embodiments, the first input that corresponds to the second command is a press and hold input made with a mouse (e.g., a continuous mouse click for at least a predefined amount of time while a cursor is hovering over the content object) (632). For example, the user may make a continuous mouse click while cursor 508 is positioned over content object 504 as shown in FIG. 5D.

In some embodiments, the first input that corresponds to the second command is a press and hold input made with a finger on a touch-sensitive display (e.g., a touch and hold gesture for at least a predefined amount of time at a location on the touch-sensitive surface corresponding to the content object) (634). If display 340 is a touch-sensitive display, the user may perform a touch and hold gesture on content object 504.

In some embodiments, in response to the determination that the first user input corresponds to the second command (612), the device visually deemphasizes (636) the first electronic document relative to the separated content object (e.g., by shading the first electronic document, by making the first electronic document recede from the separated content object, and/or by displaying the first electronic document as out of focus). Equivalently, the separated content object may be visually emphasized (e.g., by highlighting) relative to the first electronic document. For example, in FIG. 5F, document 504 is visually deemphasized (as indicated by the dotted background).

In some embodiments, while displaying the plurality of icons proximate (e.g., adjacent) to the separated content object, the device detects a second user input (638). In response to detecting the second user input (640), the device ceases to display (642) the plurality of icons, translates (644) the separated content object in accordance with the second input, ceases (646) to visually deemphasize the first electronic document relative to the separated content object, and creates and displays (648) a copy of the content object in the second electronic document. For example, while icons 514 are displayed (and content object 504 is separated from document 502), as in FIG. 5F, a user input corresponding to a drag-and-drop command on content object 504 may be detected. In response to detection of the user input, icons 514 cease to be displayed and document 502 ceases to be visually deemphasized, as shown in FIG. 5H. Content object 504 (or representation 511 of content object 504) is dragged (i.e., translated) across display 340 toward document 506 in accordance with the drag-and-drop user input. Copy 512 of content object 504 is created and displayed in document 506.

In some embodiments, while displaying the plurality of icons proximate (e.g., adjacent) to the separated content object, the device detects (650) a second user input that starts on the separated content object. In response to detecting the second user input (652), the device ceases (642) to display the plurality of icons, translates (644) the separated content object in accordance with the second input, and creates and displays (648) a copy of the content object in the second electronic document. Once the content object is separated, the user can still perform a drag-and-drop operation simply by translating the content object instead of activating one of the plurality of icons. For example, while content object 504 is separated from document 502 and icons 514 are displayed, as in FIG. 5F, a user input corresponding to a drag-and-drop command on content object 504 may be detected. In response to detection of the user input, icons 514 cease to be displayed, as shown in FIG. 5H. Content object 504 (or a representation 511 of content object 504) is dragged (i.e., translated) across display 340 toward document 506 in accordance with the drag-and-drop user input. Copy 512 of content object 504 is created and displayed in document 506.

In some embodiments, while displaying the plurality of icons proximate (e.g., adjacent) to the separated content object, the device detects (654) a third user input away from the separated content object (e.g., a mouse click with the cursor located over the first electronic document, the second electronic document, or any part of the display other than the separated content object; or a finger tap gesture on a touch-sensitive display on the first electronic document, the second electronic document, or any part of the display other than the separated content object). In response to detecting the third user input (656), the device ceases to display (642) the plurality of icons, ceases to separate (658) the content object from the first electronic document, and displays (660) the content object at the location of the content object in the first electronic document immediately prior to detecting the first input (and, in some embodiments, ceasing to visually deemphasize the first electronic document relative to the content object). For example, in FIG. 5I, while content object 504 is separated from document 502 and icons 514 are displayed, a user input (e.g., mouse click) is detected while cursor 508 is away from content object 504 and icons 514. In response to detection of the gesture, icons 514 cease to be displayed, and content object 504 is displayed at its original location in document 502 and ceases to be separated from document 502, as shown in FIG. 5J.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 700 and 800 (e.g., FIGS. 7 and 8 respectively) are also applicable in an analogous manner to method 600 described above with respect to FIGS. 6A-6D. For example, the displaying of the animation separating the content object from the first electronic document and the visual deemphasizing of the first electronic document described above with reference to method 600 may have one or more of the characteristics of the displaying of the animation separating the content object from the first electronic document and the visual deempha-sizing of the first electronic document described herein with reference to methods 700 and 800. For brevity, these details are not repeated here.

Figure 7:
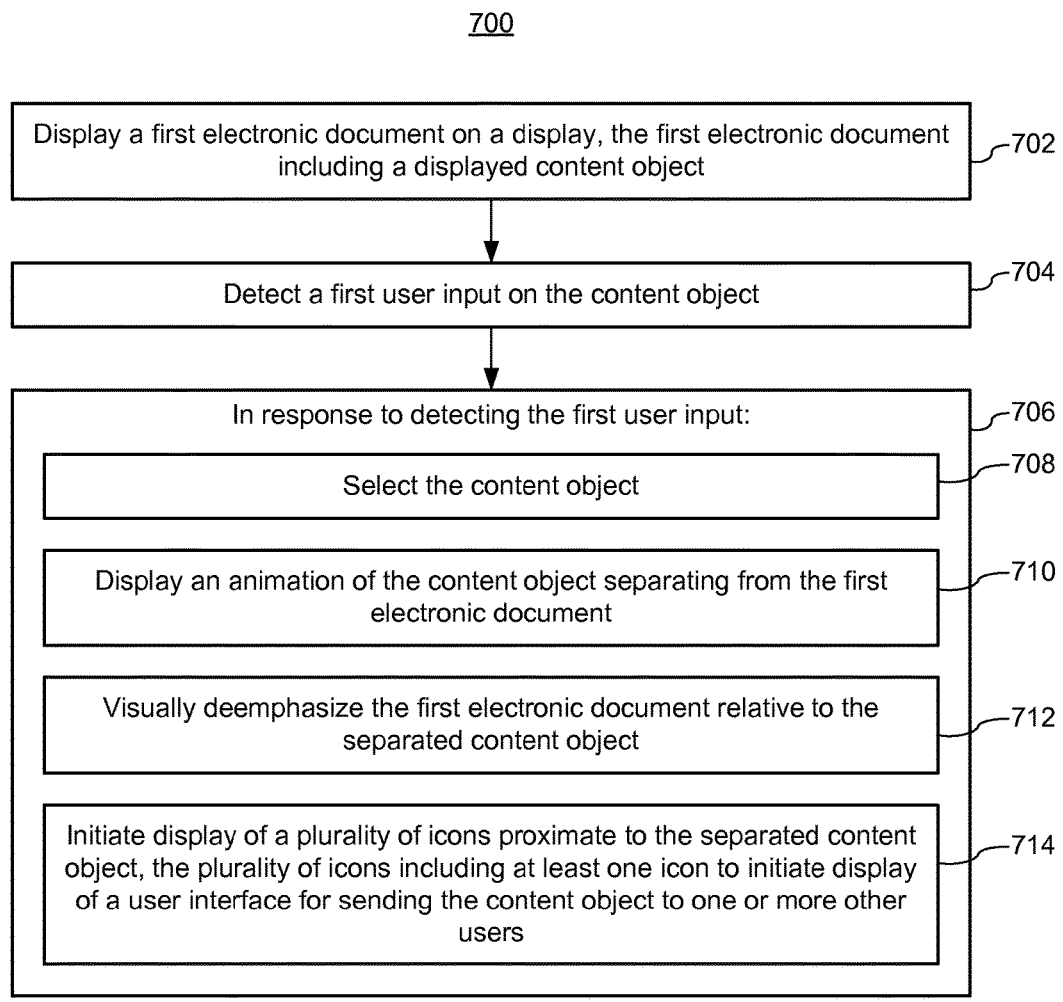
FIG. 7 is a flow diagram illustrating a method of sharing a content object in a document in accordance with some embodiments.

FIG. 7 is a flow diagram illustrating a method 700 of sharing a content object in a document in accordance with some embodiments. The method 700 is performed at an electronic device (e.g., device 300, FIG. 3, or portable multifunction device 100, FIG. 1) with a display and optionally a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to share content objects in a document. The method reduces the cognitive burden on a user when sharing content objects in a document, thereby creating a more efficient human-machine interface. For battery-operated electronic devices, enabling a user to share content objects in a document faster and more efficiently conserves power and increases the time between battery charges.

The device displays (702) a first electronic document (e.g., a web page, word processing document, presentation document, spreadsheet, electronic book, an email message, a text message, an instant message, or a text document) on the display. The first electronic document includes a displayed content object (e.g., a digital image, an inline video, inline audio, text highlighted by a user, a file attachment). FIG. 5A, for example, shows document 502 displayed on display 340. Document 502 includes content object 504 that is also displayed.

The device detects (704) a first user input on the content object. For example, a user input that includes a press and hold input may be detected while cursor 508 is positioned over content object 504, as shown in FIG. 5D.

In response to detecting the first user input (706), the device selects (708) the content object, displays (710) an animation of the content object separating from the first electronic document, visually deemphasizes (712) the first electronic document relative to the separated content object (e.g., by shading the first electronic document, by making the first electronic document recede from the separated content object, and/or by displaying the first electronic document as out of focus), and initiates (714) display of a plurality of icons proximate (e.g., adjacent) to the separated content object, the plurality of icons including at least one icon to initiate display of a user interface for sending the content object to one or more other users. For example, as shown in FIGS. 5D-5F, when the detected user input includes a press and hold input while cursor 508 is positioned over content object 504, content object 504 is selected and an animation showing content object 504 separating from document 502 is displayed. Also, icons 514 are displayed near content object 504. Additionally, document 504 is visually deemphasized (as indicated by the dotted background).

With respect to the visual deemphasizing, equivalently, the separated content object may be visually emphasized (e.g., by highlighting) relative to the first electronic document.

It should be understood that the particular order in which the operations in FIG. 7 has been described is merely exemplary and is not intended to indicate that the described order is the only order in which the operations could be performed. One of ordinary skill in the art would recognize various ways to reorder the operations described herein.

Additionally, it should be noted that details of other processes described herein with respect to methods 600 and 800 (e.g., FIGS. 6A-6D and 8 respectively) are also applicable in an analogous manner to method 700 described above with respect to FIG. 7. For example, the displaying of the animation and the visual deemphasizing described above with reference to method 700 may have one or more of the characteristics of the displaying of the animation and the visual deemphasizing described herein with reference to methods 600 and 800. For brevity, these details are not repeated here.

Figure 8:
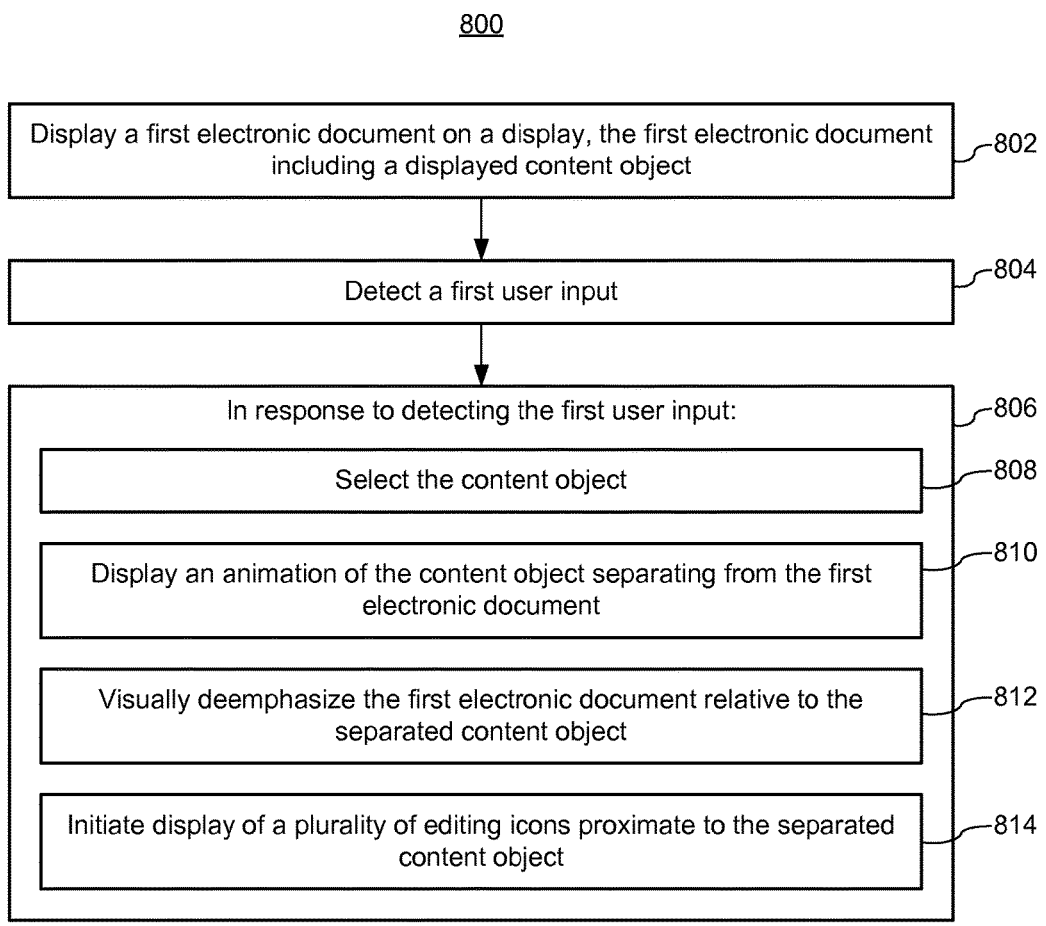
FIG. 8 is a flow diagram illustrating a method of displaying an editing interface for a content object in a document in accordance with some embodiments.

FIG. 8 is a flow diagram illustrating a method of displaying an editing interface for a content object in a document in accordance with some embodiments. The method 800 is performed at an electronic device (e.g., device 300, FIG. 3, or portable multifunction device 100, FIG. 1) with a display and optionally a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to display an editing interface for a content object. The method reduces the cognitive burden on a user when editing a content object in a document, thereby creating a more efficient human-machine interface. For battery-operated electronic devices, enabling a user to edit objects in a document faster and more efficiently conserves power and increases the time between battery charges.

The device displays (802) a first electronic document (e.g., a web page, word processing document, presentation document, spreadsheet, electronic book, an email message, a text message, an instant message, or a text document) on the display. The first electronic document includes a displayed content object (e.g., a digital image, an inline video, inline audio, text highlighted by a user, a file attachment). FIG. 5Q, for example, shows document 532 displayed on display 340. Document 532 includes content object 534 that is also displayed.

The device detects (804) a first user input. In some embodiments, the first input starts on the content object. For example, a user input that includes a press and hold input may be detected while cursor 508 is positioned over content object 504, as shown in FIG. 5Q, or activation of icon 538 (FIG. 5R).

In response to detecting the first user input (806), the device selects (808) the content object, displays (810) an animation of the content object separating from the first electronic document, visually deemphasizes (812) the first electronic document relative to the separated content object (e.g., by shading the first electronic document, by making the first electronic document recede from the separated content object, and/or by displaying the first electronic document as out of focus), and initiates (814) display of a plurality of editing icons proximate (e.g., adjacent) to the separated content object. For example, as shown in FIGS. 5Q and 5S, when the detected user input includes a press and hold input while cursor 508 is positioned over content object 534 (or over an icon like 538, not shown in FIG. 5Q), content object 534 is selected and an animation showing content object 534 separating from document 532 is displayed. Also, editing icons 528 are displayed near content object 534. Additionally, document 532 is visually deemphasized (as indicated by the dotted background).

With respect to the visual deemphasizing, equivalently, the separated content object may be visually emphasized (e.g., by highlighting) relative to the first electronic document.

It should be understood that the particular order in which the operations in FIG. 8 has been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600 and 700 (e.g., FIGS. 6A-6D and 7 respectively) are also applicable in an analogous manner to method 800 described above with respect to FIG. 8. For example, the displaying of the animation and the visual deemphasizing described above with reference to method 800 may have one or more of the characteristics of the displaying of the animation and the visual deemphasizing described herein with reference to methods 600 and 700. For brevity, these details are not repeated here.

Figure 9:
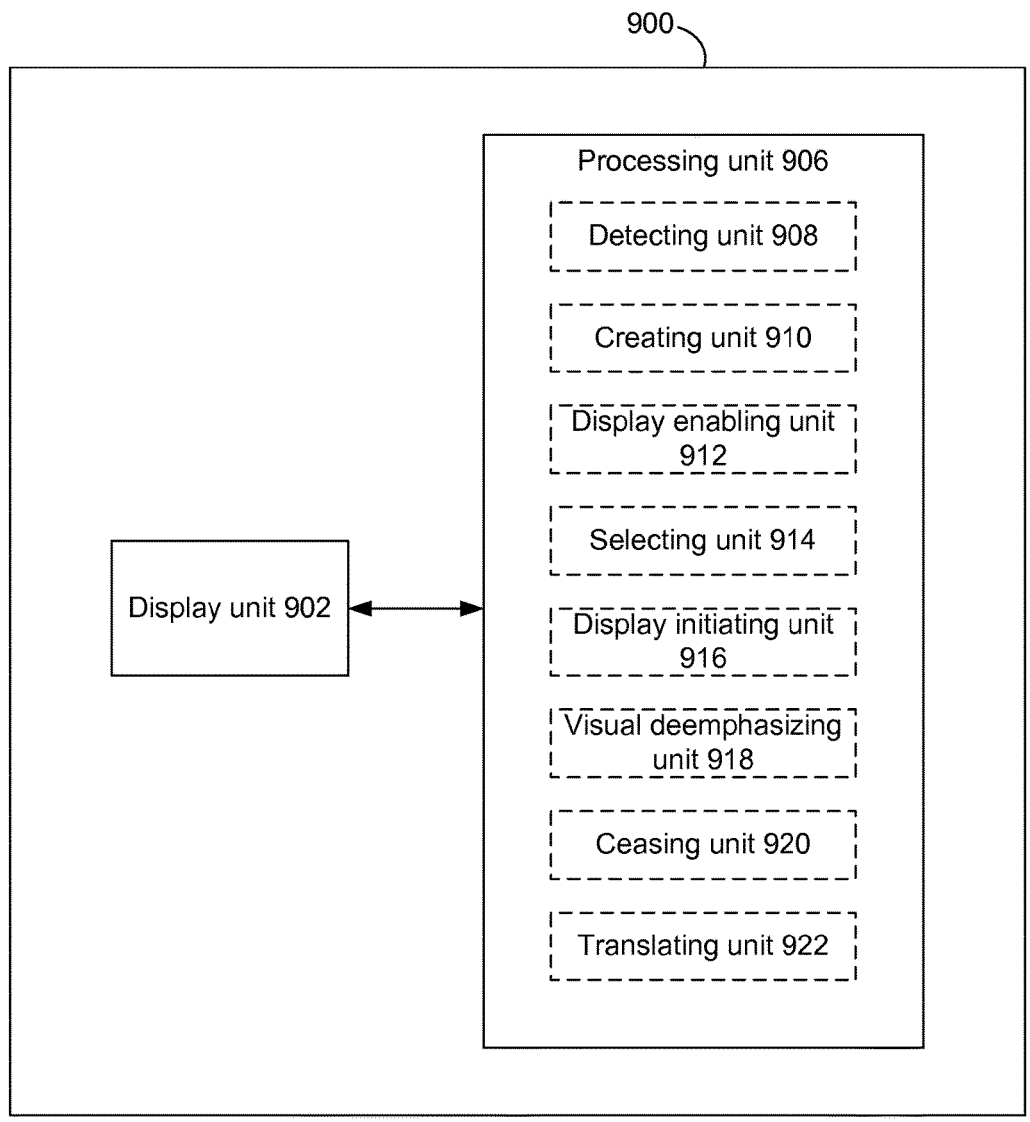
FIG. 9 is a functional block diagram of an electronic device in accordance with some embodiments.

In accordance with some embodiments, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, an electronic device 900 includes a display unit 902 configured to concurrently display a first electronic document and a second electronic document on the display unit 902, the first electronic document including a displayed content object; and a processing unit 906 coupled to the display unit 902. In some embodiments, the processing unit 906 includes a detecting unit 908, a creating unit 910, a display enabling unit 912, a selecting unit 914, a display initiating unit 916, a visual deemphasizing unit 918, a ceasing unit 920, and a translating unit 922.

The processing unit 906 is configured to: detect a first user input that starts on the content object (e.g., with the detecting unit 908); in response to a determination that the first user input corresponds to a first command, create and enable display of a copy of the content object in the second electronic document (e.g., with the creating unit 910 and the display enabling unit 912); and, in response to a determination that the first user input corresponds to a second command, distinct from the first command: select the content object (e.g., with the selecting unit 914), enable display of an animation of the content object separating from the first electronic document (e.g., with the display enabling unit 912), and initiate display of a plurality of icons proximate to the separated content object, the plurality of icons including at least one icon to initiate display of a user interface for sending the content object to one or more other users (e.g., with the display initiating unit 916).

In some embodiments, the first input that corresponds to the first command is a click and drag input made with a mouse that corresponds to a drag-and-drop command.

In some embodiments, the first input that corresponds to the first command is a tap and drag input made with a finger on a touch-sensitive display unit 902 that corresponds to a drag-and-drop command.

In some embodiments, the first input that corresponds to the second command is a press and hold input made with a mouse.

In some embodiments, the first input that corresponds to the second command is a press and hold input made with a finger on a touch-sensitive display unit 902.

In some embodiments, the animation depicts the content object being pulled out of the first electronic document and hovering over the first electronic document.

In some embodiments, the processing unit 906 is configured to: in response to the determination that the first user input corresponds to the second command, visually deemphasize the first electronic document relative to the separated content object (e.g., with the visual deemphasizing unit 918).

In some embodiments, the processing unit 906 is configured to: while displaying the plurality of icons proximate to the separated content object, detect a second user input (e.g., with the detecting unit 908); in response to detecting the second user input: cease to display the plurality of icons (e.g., with the ceasing unit 920), translate the separated content object in accordance with the second input (e.g., with the translating unit 922), cease to visually deemphasize the first electronic document relative to the separated content object (e.g., with the ceasing unit 920), and create and enable display of a copy of the content object in the second electronic document (e.g., with the creating unit 910 and the display enabling unit 912).

In some embodiments, wherein the plurality of icons includes an icon to initiate display of a user interface for sending the content object in an instant message to one or more other users.

In some embodiments, the plurality of icons includes an icon to initiate display of a user interface for emailing the content object to one or more other users.

In some embodiments, the plurality of icons includes an icon to initiate display of a user interface for tweeting the content object.

In some embodiments, the plurality of icons includes an icon to initiate tweeting the content object.

In some embodiments, the plurality of icons includes an icon to initiate display of a user interface for editing the content object.

In some embodiments, the processing unit 906 is configured to: while displaying the plurality of icons proximate to the separated content object, detecting a second user input that starts on the separated content object (e.g., with the detecting unit 908); in response to detecting the second user input: cease to display the plurality of icons (e.g., with the ceasing unit 920), translate the separated content object in accordance with the second input (e.g., with the translating unit 922), and create and enable display of a copy of the content object in the second electronic document (e.g., with the creating unit 910 and the display enabling unit 912).

In some embodiments, the processing unit 906 is configured to: while displaying the plurality of icons proximate to the separated content object, detecting a third user input away from the separated content object (e.g., with the detecting unit 908); in response to detecting the third user input: cease to display the plurality of icons (e.g., with the ceasing unit 920), cease to separate the content object from the first electronic document (e.g., with the ceasing unit 920), and enable display of the content object at the location of the content object in the first electronic document immediately prior to detecting the first input (e.g., with the display enabling unit 912).

Figure 10:
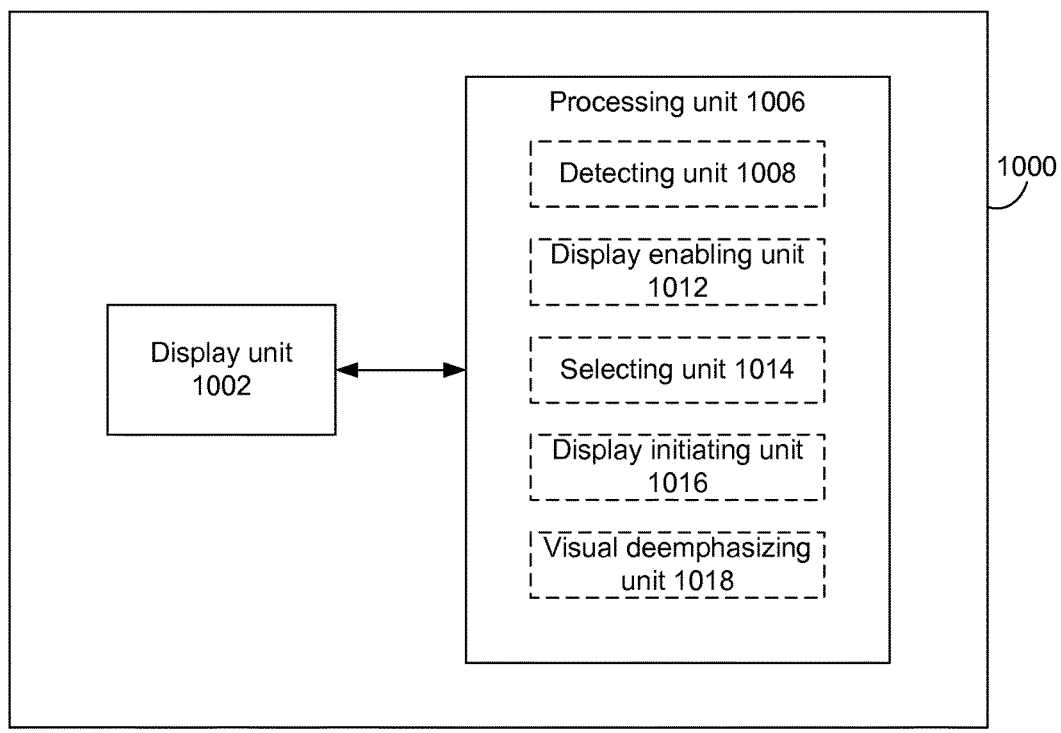
FIG. 10 is a functional block diagram of an electronic device in accordance with some embodiments.

In accordance with some embodiments, FIG. 10 shows a functional block diagram of an electronic device 1000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 10 may be combined or separated into sub-blocks to implement the principles of the invention as described above. Therefore, the description herein may support any possible combination or separation or further definition of the functional blocks described herein.

As shown in FIG. 10, an electronic device 1000 includes a display unit 1002 configured to display a first electronic document on the display unit 1002, the first electronic document including a displayed content object; and a processing unit 1006 coupled to the display unit 1002. In some embodiments, the processing unit 1006 includes a detecting unit 1008, a display enabling unit 1012, a selecting unit 1014, a display initiating unit 1016, and a visual deemphasizing unit 1018. The processing unit 1006 is configured to: detect a first user input on the content object (e.g., with the detecting unit 1008); and in response to detecting the first user input: select the content object (e.g., with the selecting unit 1014), enable display of an animation of the content object separating from the first electronic document (e.g., with the display enabling unit 1012), visually deemphasize the first electronic document relative to the separated content object (e.g., with the visual deemphasizing unit 1018), and initiate display of a plurality of icons proximate to the separated content object, the plurality of icons including at least one icon to initiate display of a user interface for sending the content object to one or more other users (e.g., with the display initiating unit 1016).

In some embodiments, electronic device 1000 includes a display unit 1002 configured to display a first electronic document on the display unit 1002, the first electronic document including a displayed content object; and a processing unit 1006 coupled to the display unit 1002. In some embodiments, the processing unit 1006 includes a detecting unit 1008, a display enabling unit 1012, a selecting unit 1014, a display initiating unit 1016, and a visual deemphasizing unit 1018. The processing unit 1006 is configured to: detect a first user input (e.g., with the detecting unit 1008); and in response to detecting the first user input: select the content object (e.g., with the selecting unit 1014), enable display of an animation of the content object separating from the first electronic document (e.g., with the display enabling unit 1012), visually deemphasize the first electronic document relative to the separated content object (e.g., with the visual deemphasizing unit 1018), and initiate display of a plurality of editing icons proximate to the separated content object (e.g., with the display initiating unit 1016).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 3, 9-10) are all included within the scope of protection of the invention.

The operations described above with reference to FIGS. 6A-6D, 7-8 may be implemented by components depicted in FIGS. 1A-1B. For example, detection operation 604, creating and displaying operation 606, selecting operation 614, displaying operation 616, and display initiating operation 620 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   one or more processors;
   memory; and
   one or more programs, wherein the one or more programs are stored in the memory and configured to be executed by the one or more processors, the one or more programs including instructions for:
      concurrently displaying a first application region and a second application region on the display, the first application region including a displayed content object;
      while concurrently displaying the first application region and the second application region on the display, detecting a first portion of a first user input directed to the content object; and
      while the first user input continues to be detected:
         in accordance with a determination that the first user input meets an input threshold while the first user input is substantially stationary, displaying a menu that includes a plurality of selectable options associated with the content object;
         in accordance with a determination that the first user input does not meet the input threshold while the first user input is substantially stationary, maintaining display of the content object without displaying the plurality of selectable options associated with the content object;
         detecting a second portion of the first user input; and
         in response to detecting the second portion of the first user input:
            in accordance with a determination that the second portion of the first user input included more than a threshold amount of movement and that the plurality of selectable options associated with the content object were displayed when the movement of the first user input was detected, ceasing to display the plurality of selectable options and move the content object in accordance with the movement of the first user input; and
            in accordance with a determination that the second portion of the first user input did not include more than a threshold amount of movement before an end of the first user input was detected and that the plurality of selectable options associated with the content object were displayed when an end of the first user input was detected, maintaining display the plurality of selectable options on the display.

2. The device of claim 1, wherein, in accordance with the determination that the second portion of the first user input included more than the threshold amount of movement, at least a portion of the first user input corresponds to a first command that is a click and drag input made with a mouse that corresponds to a drag-and-drop command.

3. The device of claim 1, wherein, in accordance with the determination that the second portion of the first user input included more than the threshold amount of movement, at least a portion of the first user input corresponds to a second command that is a tap and drag input made with a finger on a touch-sensitive display that corresponds to a drag-and-drop command.

4. The device of claim 1, wherein, in accordance with the determination that the first user input meets the input threshold while the first user input is substantially stationary, at least a portion of the first user input corresponds to a third command that is a press and hold input made with a mouse.

5. The device of claim 1, wherein, in accordance with the determination that the first user input meets the input threshold while the first user input is substantially stationary, at least a portion of the first user input corresponds to a fourth command that is a press and hold input made with a finger on a touch-sensitive display.

6. The device of claim 1, wherein, after moving the content object in accordance with the movement of the first user input and after the end of the first user input was detected, a copy of the content object is displayed in the second application region concurrently with the display of the content object in the first application region.

7. The device of claim 1, the one or more programs further including instructions for:
   while displaying the content object and the menu that includes the plurality of selectable options associated with the content object:
      displaying an animation of the content object separating from the first application region; and
      visually deemphasizing the first application region relative to the content object.

8. The device of claim 7, the one or more programs further including instructions for:
   while displaying the content object and the menu that includes the plurality of selectable options associated with the content object, detecting a second user input; and
   in response to detecting the second user input:
      ceasing to display the menu that includes the plurality of selectable options associated with the content object;
      translating the content object in accordance with the second user input;
      ceasing to visually deemphasize the first application region relative to the content object; and
      creating and displaying a copy of the content object in the second application region.

9. The device of claim 1, wherein the plurality of selectable options associated with the content object includes at least one option selected from the group consisting of an option to initiate display of a user interface for sending the content object in an instant message to one or more other users, an option to initiate display of a user interface for emailing the content object to one or more other users, an option to initiate display of a user interface for tweeting the content object, and an option to initiate display of a user interface for editing the content object.

10. The device of claim 1, the one or more programs further including instruction for:
while displaying the menu that includes the plurality of selectable options associated with the content object, detecting a third user input directed to the content object; and
in response to detecting the third user input:
ceasing to display the menu that includes the plurality of selectable options associated with the content object;
translating the content object in accordance with the third user input; and
creating and displaying a copy of the content object in the second application region.

11. The device of claim 1, the one or more programs further including instruction for:
while displaying the menu that includes the plurality of selectable options associated with the content object, detecting a fourth user input away from the content object; and
in response to detecting the fourth user input:
ceasing to display the menu that includes the plurality of selectable options associated with the content object; and
displaying the content object at a location of the content object in the first application region where the content object was displayed immediately prior to detecting the first user input.

12. The device of claim 1, wherein the first user input meets the input threshold when the first user input is directed to the content object for more than a predefined amount of time.

13. The device of claim 9, wherein the plurality of selectable options associated with the content object includes the option to initiate display of a user interface for editing the content object, and wherein the option to initiate display of the user interface for editing the content object initiates display of the user interface for editing the content object within the first application region prior to sending the edited content object to one or more other users.

14. A method, comprising:
at an electronic device with a display:
concurrently displaying a first application region and a second application region on the display, the first application region including a displayed content object;
while concurrently displaying the first application region and the second application region on the display, detecting a first portion of a first user input directed to the content object; and
while the first user input continues to be detected:
in accordance with a determination that the first user input meets an input threshold while the first user input is substantially stationary, displaying a menu that includes a plurality of selectable options associated with the content object;
in accordance with a determination that the first user input does not meet the input threshold while the first user input is substantially stationary, maintaining display of the content object without displaying the plurality of selectable options associated with the content object;
detecting a second portion of the first user input; and;
in response to detecting the second portion of the first user input:
in accordance with a determination that the second portion of the first user input included more than a threshold amount of movement and that the plurality of selectable options associated with the content object were displayed when the movement of the first user input was detected, ceasing to display the plurality of selectable options and move the content object in accordance with the movement of the first user input; and
in accordance with a determination that the second portion of the first user input did not include more than a threshold amount of movement before an end of the first user input was detected and that the plurality of selectable options associated with the content object were displayed when an end of the first user input was detected, maintaining display the plurality of selectable options on the display.

15. The method of claim 14, wherein, in accordance with the determination that the second portion of the first user input included more than the threshold amount of movement, at least a portion of the first user input corresponds to a first command that is a click and drag input made with a mouse that corresponds to a drag-and-drop command.

16. The method of claim 14, wherein, in accordance with the determination that the second portion of the first user input included more than the threshold amount of movement, at least a portion of the first user input corresponds to a second command that is a tap and drag input made with a finger on a touch-sensitive display that corresponds to a drag-and-drop command.

17. The method of claim 14, wherein, in accordance with the determination that the first user input meets the input threshold while the first user input is substantially stationary, at least a portion of the first user input corresponds to a third command that is a press and hold input made with a mouse.

18. The method of claim 14, wherein, in accordance with the determination that the first user input meets the input threshold while the first user input is substantially stationary, at least a portion of the first user input corresponds to a fourth command that is a press and hold input made with a finger on a touch-sensitive display.

19. The method of claim 14, wherein, after moving the content object in accordance with the movement of the first user input and after the end of the first user input was detected, a copy of the content object is displayed in the second application region concurrently with the display of the content object in the first application region.

20. The method of claim 14, further comprising:
while displaying the content object and the menu that includes the plurality of selectable options associated with the content object:
displaying an animation of the content object separating from the first application region; and
visually deemphasizing the first application region relative to the content object.

21. The method of claim 20, further comprising:
while displaying the content object and the menu that includes the plurality of selectable options associated with the content object, detecting a second user input; and
in response to detecting the second user input:
ceasing to display the menu that includes the plurality of selectable options associated with the content object;
translating the content object in accordance with the second user input;
ceasing to visually deemphasize the first application region relative to the content object; and
creating and displaying a copy of the content object in the second application region.

22. The method of claim 14, wherein the plurality of selectable options associated with the content object includes at least one option selected from the group consisting of an option to initiate display of a user interface for sending the content object in an instant message to one or more other users, an option to initiate display of a user interface for emailing the content object to one or more other users, an option to initiate display of a user interface for tweeting the content object, and an option to initiate display of a user interface for editing the content object.

23. The method of claim 14, further comprising:
while displaying the menu that includes the plurality of selectable options associated with the content object, detecting a third user input directed to the separated content object; and
in response to detecting the third user input:
ceasing to display the menu that includes the plurality of selectable options associated with the content object;
translating the separated content object in accordance with the third user input; and
creating and displaying a copy of the content object in the second application region.

24. The method of claim 14, further comprising:
while displaying the menu that includes the plurality of selectable options associated with the content object, detecting a fourth user input away from the separated content object; and
in response to detecting the fourth user input:
ceasing to display the menu that includes the plurality of selectable options associated with the content object; and
displaying the content object at a location of the content object in the first application region where the content object was displayed immediately prior to detecting the first user input.

25. The method of claim 14, wherein the first user input meets the input threshold when the first user input is directed to the content object for more than a predefined amount of time.

26. The method of claim 22, wherein the plurality of selectable options associated with the content object includes the option to initiate display of the user interface for editing the content object, and wherein the option to initiate display of the user interface for editing the content object initiates display of the user interface for editing the content object within the first application region prior to sending the edited content object to one or more other users.

27. A non-transitory computer readable medium storing one or more programs configured to be executed by an electronic device with one or more processors and a display, the one or more programs including instructions for:
concurrently displaying a first application region and a second application region on the display, the first application region including a displayed content object;
while concurrently displaying the first application region and the second application region on the display, detecting a first portion of a first user input directed to the content object; and
while the first user input continues to be detected:
in accordance with a determination that the first user input meets an input threshold while the first user input is substantially stationary, displaying a menu that includes a plurality of selectable options associated with the content object;
in accordance with a determination that the first user input does not meet the input threshold while the first user input is substantially stationary, maintaining display of the content object without displaying the plurality of selectable options associated with the content object;
detecting a second portion of the first user input; and;
in response to detecting the second portion of the first user input:
in accordance with a determination that the second portion of the first user input included more than a threshold amount of movement and that the plurality of selectable options associated with the content object were displayed when the movement of the first user input was detected, ceasing to display the plurality of selectable options and move the content object in accordance with the movement of the first user input; and
in accordance with a determination that the second portion of the first user input did not include more than a threshold amount of movement before an end of the first user input was detected and that the plurality of selectable options associated with the content object were displayed when an end of the first user input was detected, maintaining display the plurality of selectable options on the display.

28. The computer readable medium of claim 27, wherein, in accordance with the determination that the second portion of the first user input included more than the threshold amount of movement, at least a portion of the first user input corresponds to a first command that is a click and drag input made with a mouse that corresponds to a drag-and-drop command.

29. The computer readable medium of claim 27, wherein, in accordance with the determination that the second portion of the first user input included more than the threshold amount of movement, at least a portion of the first user input corresponds to a second command that is a tap and drag input made with a finger on a touch-sensitive display that corresponds to a drag-and-drop command.

30. The computer readable medium of claim 27, wherein, in accordance with the determination that the first user input meets the input threshold while the first user input is substantially stationary, at least a portion of the first user input corresponds to a third command that is a press and hold input made with a mouse.

31. The computer readable medium of claim 27, wherein, in accordance with the determination that the first user input meets the input threshold while the first user input is substantially stationary, at least a portion of the first user input corresponds to a fourth command that is a press and hold input made with a finger on a touch-sensitive display.

32. The computer readable medium of claim 27, wherein, after moving the content object in accordance with the movement of the first user input and after the end of the first user input was detected, a copy of the content object is displayed in the second application region concurrently with the display of the content object in the first application region.

33. The computer readable medium of claim 27, the one or more programs further including instructions for:
while displaying the content object and the menu that includes the plurality of selectable options associated with the content object:
displaying an animation of the content object separating from the first application region; and
visually deemphasizing the first application region relative to the content object.

34. The computer readable medium of claim 33, the one or more programs further including instructions for:
while displaying the content object and the menu that includes the plurality of selectable options associated with the content object, detecting a second user input; and
in response to detecting the second user input:
ceasing to display the menu that includes the plurality of selectable options associated with the content object;
translating the content object in accordance with the second user input;
ceasing to visually deemphasize the first application region relative to the content object; and
creating and displaying a copy of the content object in the second application region.

35. The computer readable medium of claim 27, wherein the plurality of selectable options associated with the content object includes at least one option selected from the group consisting of an option to initiate display of a user interface for sending the content object in an instant message to one or more other users, an option to initiate display of a user interface for emailing the content object to one or more other users, an option to initiate display of a user interface for tweeting the content object, and an option to initiate display of a user interface for editing the content object.

36. The computer readable medium of claim 27, the one or more programs further including instructions for:
while displaying the menu that includes the plurality of selectable options associated with the content object, detecting a third user input directed to the content object; and
in response to detecting the third user input:
ceasing to display the menu that includes the plurality of selectable options associated with the content object;
translating the content object in accordance with the third user input; and
creating and displaying a copy of the content object in the second application region.

37. The computer readable medium of claim 27, the one or more programs further including instructions for:
while displaying the menu that includes the plurality of selectable options associated with the content object, detecting a fourth user input away from the content object; and
in response to detecting the fourth user input:
ceasing to display the menu that includes the plurality of selectable options associated with the content object; and
displaying the content object at a location of the content object in the first application region where the content object was displayed immediately prior to detecting the first user input.

38. The computer readable medium of claim 27, wherein the first user input meets the input threshold when the first user input is directed to the content object for more than a predefined amount of time.

39. The computer readable medium of claim 35, wherein the plurality of selectable options associated with the content object includes the option to initiate display of the user interface for editing the content object, and wherein the option to initiate display of the user interface for editing the content object initiates display of the user interface for editing the content object within the first application region prior to sending the edited content object to one or more other users.

* * * * *

UNITED STATES PATENT AND TRADEMARK OFFICE
CERTIFICATE OF CORRECTION

PATENT NO. : 10,289,660 B2
APPLICATION NO. : 13/710379
DATED : May 14, 2019
INVENTOR(S) : Chanaka G. Karunamuni et al.

It is certified that error appears in the above-identified patent and that said Letters Patent is hereby corrected as shown below:

In the Claims

Claim 1, Column 33, Line 58, delete "and;" and insert -- and --.

Claim 14, Column 36, Line 7, delete "and;" and insert -- and --.

Claim 23, Column 37, Line 35, after "the", delete "separated".

Claim 27, Column 38, Line 20, delete "and;" and insert -- and --.

Signed and Sealed this
Twenty-second Day of October, 2019

Andrei Iancu
*Director of the United States Patent and Trademark Office*